(12) United States Patent
Dalla Guarda et al.

(10) Patent No.: US 11,952,074 B2
(45) Date of Patent: Apr. 9, 2024

(54) MANUAL CONTROL DEVICE FOR A BICYCLE

(71) Applicant: CAMPAGNOLO S.R.L., Vicenza (IT)

(72) Inventors: Gaetano Dalla Guarda, Schio-VI (IT);
Marco Porro, Abano Terme-PD (IT);
Michele Fassina, Vigonza-PD (IT)

(73) Assignee: CAMPAGNOLO S.R.L., Vicenza (IT)

( * ) Notice: Subject to any disclaimer, the term of this patent is extended or adjusted under 35 U.S.C. 154(b) by 5 days.

(21) Appl. No.: 17/870,323

(22) Filed: Jul. 21, 2022

(65) Prior Publication Data
US 2023/0031666 A1 Feb. 2, 2023

(30) Foreign Application Priority Data
Jul. 27, 2021 (IT) .......................... 102021000019979

(51) Int. Cl.
*B62K 23/06* (2006.01)

(52) U.S. Cl.
CPC .................................... *B62K 23/06* (2013.01)

(58) Field of Classification Search
CPC ........... B62L 3/02; B62K 23/06; B62M 25/08
See application file for complete search history.

(56) References Cited

U.S. PATENT DOCUMENTS

| | | |
|---|---|---|
| 6,216,060 B1 | 4/2001 | Kishimoto |
| 6,352,486 B1 | 3/2002 | Wesling |
| 8,272,292 B2 | 9/2012 | De Perini |
| 9,399,500 B1 | 7/2016 | Hashimoto et al. |
| 9,491,788 B1 | 11/2016 | Kasai et al. |
| 10,676,156 B2 | 6/2020 | Masciolini et al. |
| 11,884,355 B2 * | 1/2024 | Dalla Guarda ........ B62M 25/08 |

(Continued)

FOREIGN PATENT DOCUMENTS

| | | | |
|---|---|---|---|
| CN | 201501498 U | 6/2010 | |
| DE | 102008019786 B3 * | 8/2009 | ................ F16C 1/20 |

(Continued)

OTHER PUBLICATIONS

Italian Search Report in Italian Application No. 102021000019967, Mar. 23, 2022 with English translation.

(Continued)

*Primary Examiner* — Charles A Fox
*Assistant Examiner* — Gregory T Prather
(74) *Attorney, Agent, or Firm* — Steinfl+Bruno LLP

(57) ABSTRACT

A bicycle electronic controller has a body with a push-operated switch, a manual actuation member for issuing a command, and a motion transmission device interposed between the manual actuation member and the switch. The motion transmission device includes a guide element which is provided with a filiform through cavity and has a first end fixed in proximity to the manual actuation member and a second end fixed in proximity to the switch. A longitudinally, substantially incompressible filiform body is slidingly guided within the guide element and has a first end pushed by actuation of the manual actuation member and a second end that pushes on the switch. The switch is housed within the electronic controller body where a tight insulation can be achieved in addition to arranging the actuation member where it is more ergonomic.

14 Claims, 10 Drawing Sheets

(56) References Cited

U.S. PATENT DOCUMENTS

| | | | |
|---|---|---|---|
| 2008/0168856 A1 | 7/2008 | Tetsuka | |
| 2008/0210043 A1* | 9/2008 | De Perini | B62K 23/06 74/502.2 |
| 2008/0210045 A1 | 9/2008 | De Perini et al. | |
| 2009/0031841 A1* | 2/2009 | Tetsuka | B62M 25/04 74/473.12 |
| 2009/0188340 A1 | 7/2009 | Tetsuka et al. | |
| 2009/0211392 A1* | 8/2009 | Hahn | F16C 1/26 74/502.5 |
| 2009/0315692 A1 | 12/2009 | Miki et al. | |
| 2010/0010709 A1 | 1/2010 | Song | |
| 2011/0320093 A1 | 12/2011 | Kitamura | |
| 2013/0090195 A1 | 4/2013 | Yamaguchi et al. | |
| 2014/0169011 A1 | 6/2014 | Tsai et al. | |
| 2014/0174866 A1 | 6/2014 | Matsushita | |
| 2015/0259025 A1 | 9/2015 | Sala et al. | |
| 2015/0284049 A1 | 10/2015 | Shipman et al. | |
| 2017/0305489 A1 | 10/2017 | Komatsu et al. | |
| 2018/0037299 A1 | 2/2018 | Masciolini et al. | |
| 2018/0057103 A1 | 3/2018 | Komatsu et al. | |
| 2018/0057104 A1 | 3/2018 | Komatsu et al. | |
| 2018/0057105 A1 | 3/2018 | Komatsu et al. | |
| 2019/0270494 A1 | 9/2019 | Liao | |
| 2019/0315436 A1 | 10/2019 | Wu | |
| 2019/0382074 A1 | 12/2019 | Bierwerth et al. | |
| 2019/0382081 A1 | 12/2019 | Bierwerth et al. | |
| 2020/0346710 A1 | 11/2020 | Komatsu et al. | |
| 2020/0407011 A1 | 12/2020 | Luman et al. | |
| 2021/0394865 A1 | 12/2021 | Wesling | |
| 2023/0030090 A1 | 2/2023 | Dalla Guarda et al. | |
| 2023/0030638 A1 | 2/2023 | Dalla Guarda et al. | |
| 2023/0032763 A1 | 2/2023 | Dalla Guarda et al. | |
| 2023/0033073 A1 | 2/2023 | Dalla Guarda | |

FOREIGN PATENT DOCUMENTS

| | | |
|---|---|---|
| DE | 102013000089 A1 | 7/2014 |
| DE | 102021207735 A1 | 3/2022 |
| EP | 1964763 A1 | 9/2008 |
| EP | 2927108 A1 | 10/2015 |
| EP | 3279074 A1 | 2/2018 |
| EP | 3772449 A1 | 2/2021 |
| KR | 101485 753 B1 | 1/2015 |

OTHER PUBLICATIONS

Italian Search Report in Italian Application No. 102021000019979, Mar. 31, 2022 with English translation.
Italian Search Report in Italian Application No. 102021000019988, Apr. 7, 2022 with English translation.
Italian Search Report in Italian Application No. 102021000019991, Mar. 29, 2022 with English translation.
Italian Search Report in Italian Application No. 102021000020000, Apr. 4, 2022 with English translation.
Extended European Search Report issued for EP Patent Application No. EP 22185987A filed on Jul. 20, 2022, on behalf of Campagnolo S.R.L, Mail Date: Nov. 11, 2022. 6 Pages.
Extended European Search Report issued for EP Patent Application No. EP22185966A filed on Jul. 20, 2022, on behalf of Campagnolo S.R.L., Mail Date: Nov. 8, 2022, 7 Pages.
Extended European Search Report issued for EP Patent Application No. EP22185973A filed on Jul. 20, 2022, on behalf of Campagnolo S.R.L., Mail Date: Nov. 3, 2022, 7 Pages.
Extended European Search Report issued for EP Patent Application No. EP22185983A filed on Jul. 20, 2022, on behalf of Campagnolo S.R.L., Mail Date: Nov. 3, 2022, 7 Pages.
Extended European Search Report issued for EP Patent Application No. EP22185985A filed on Jul. 20, 2022 on behalf of Campagnolo S.R.L, Mail Date: Nov. 11, 2022. 7 Pages.
Non-Final Office Action issued for U.S. Appl. No. 17/870,384 filed on behalf of Campagnolo S.r.L...Mail date: Jun. 8, 2023. 16 pages.
Non-Final Office Action issued for U.S. Appl. No. 17/870,328, filed Jul. 21, 2022, on behalf of Campagnolo S.R.L., Mail Date: Jun. 6, 2023, 12 Pages.
Non-Final Office Action issued for U.S. Appl. No. 17/870,394, filed Jul. 21, 2022 on behalf of Campagnolo S.R.L. Mail Date: Oct. 26, 2023. 20 pages.
Non-Final Office Action issued for U.S. Appl. No. 17/870,402, filed Jul. 21, 2022 on behalf of Campagnolo S.R.L. Mail Date: Sep. 22, 2023. 17 pages.
Notice of Allowance issued for U.S. Appl. No. 17/870,328, filed Jul. 21, 2022 on behalf of Campagnolo S.R.L. Mail date: Oct. 26, 2023. 9 pages.
Notice of Allowance issued for U.S. Appl. No. 17/870,384, filed Jun. 21, 2022 on behalf of Campagnolo S.R.L. Mail Date: Sep. 22, 2023. 8 pages.

* cited by examiner

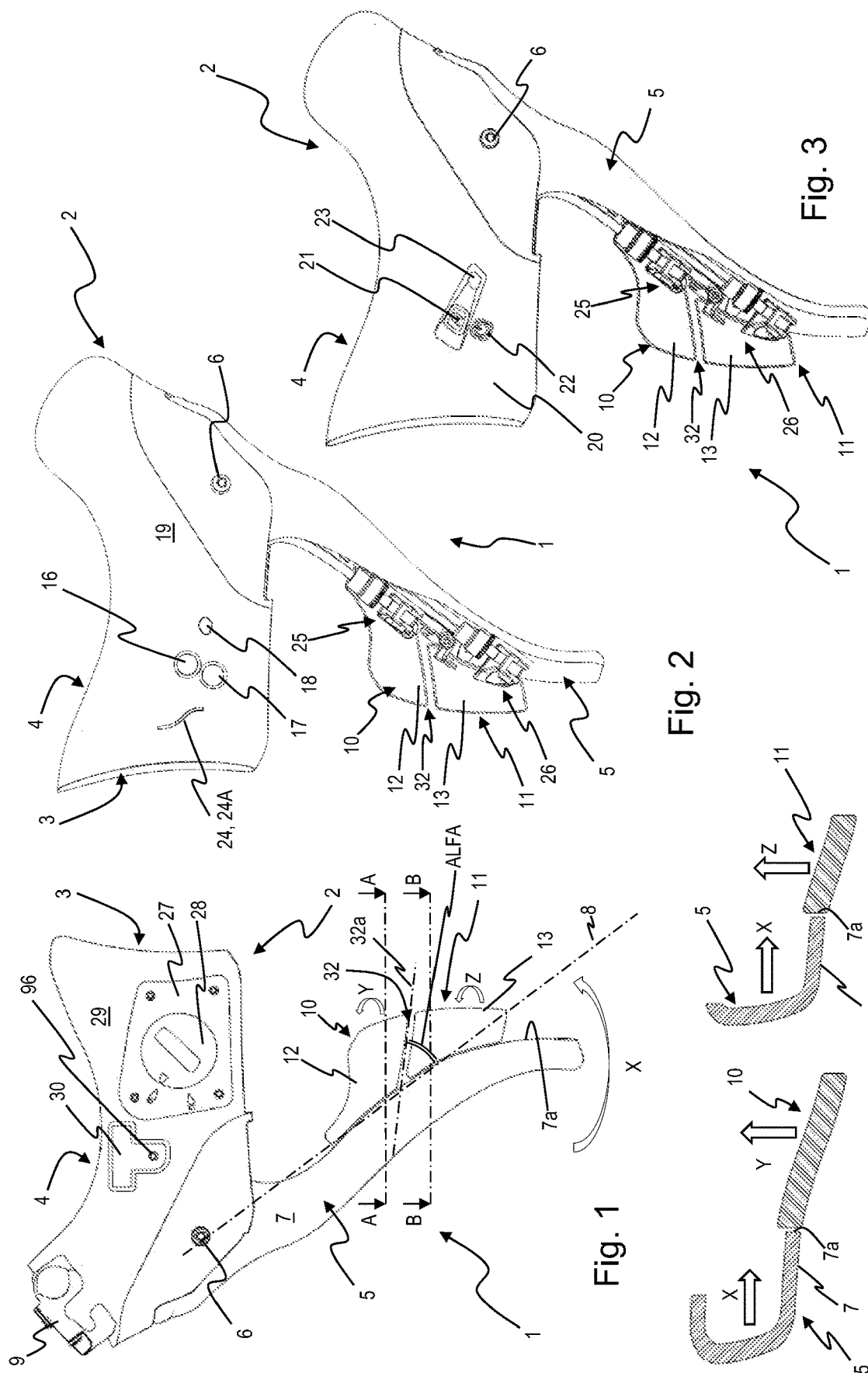

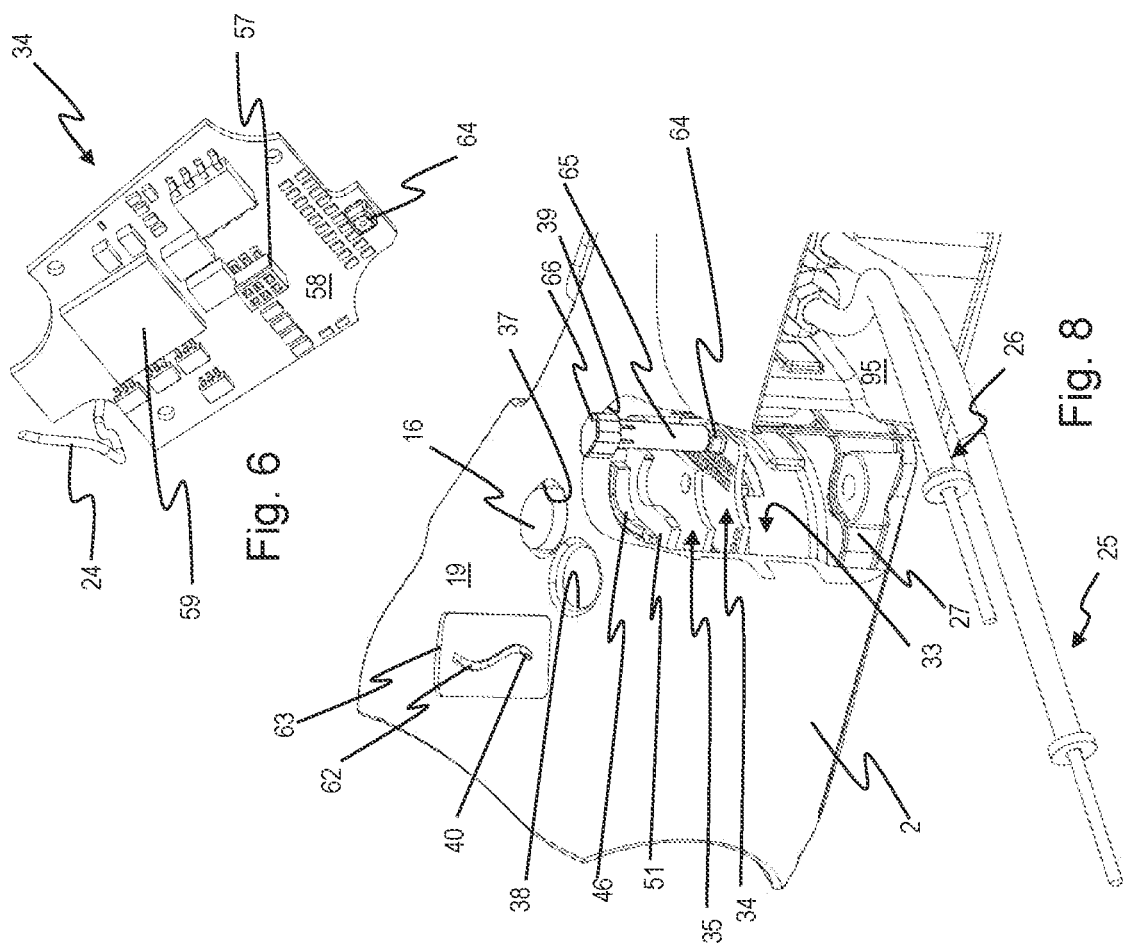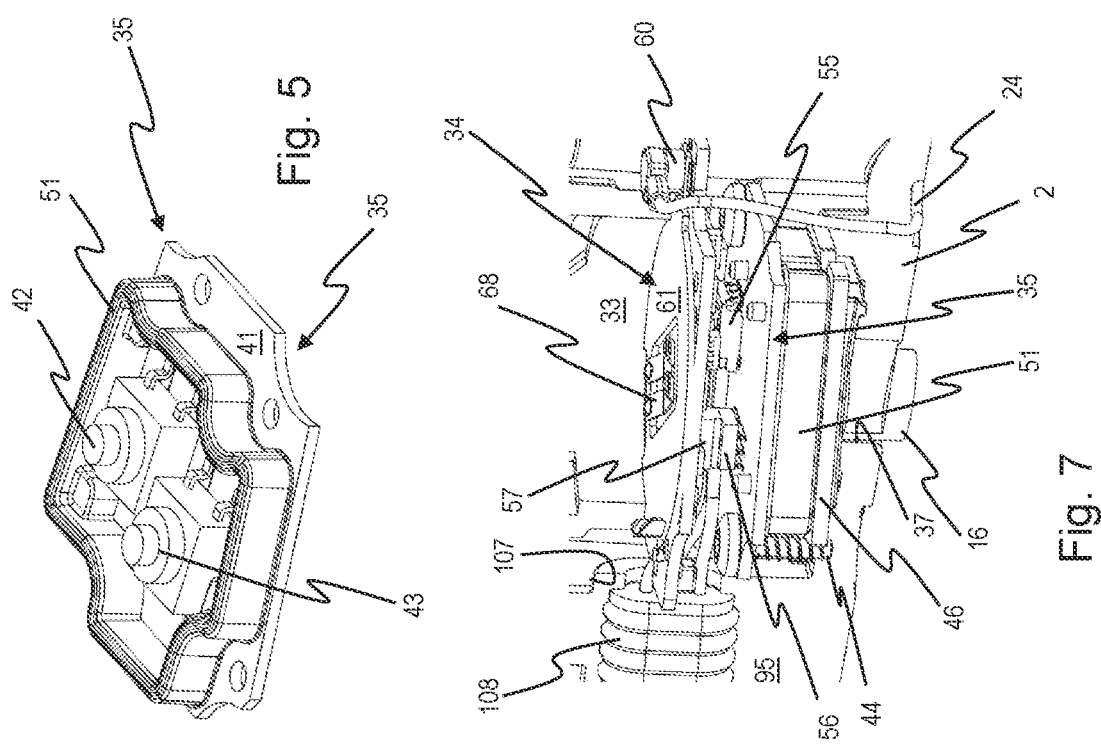

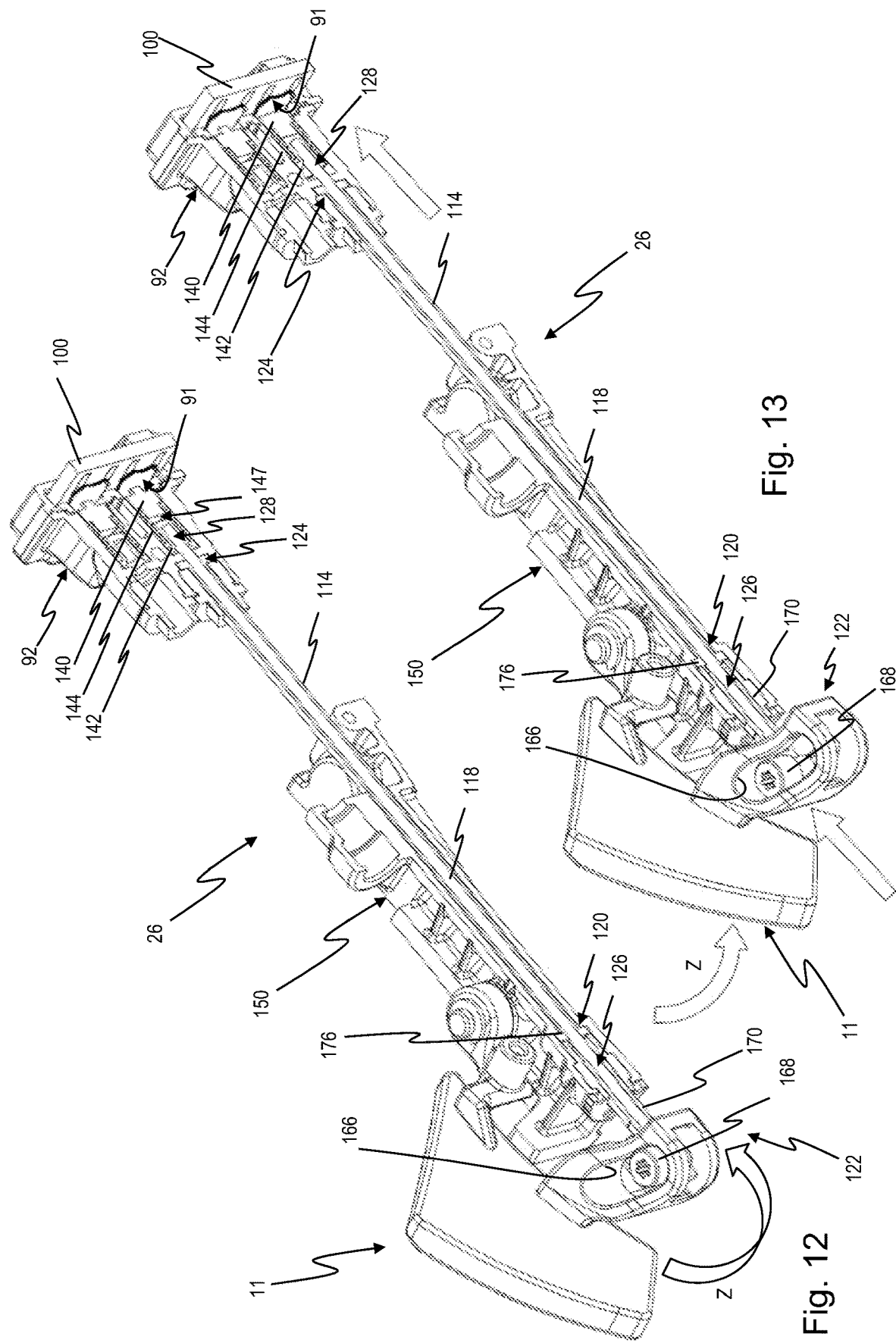

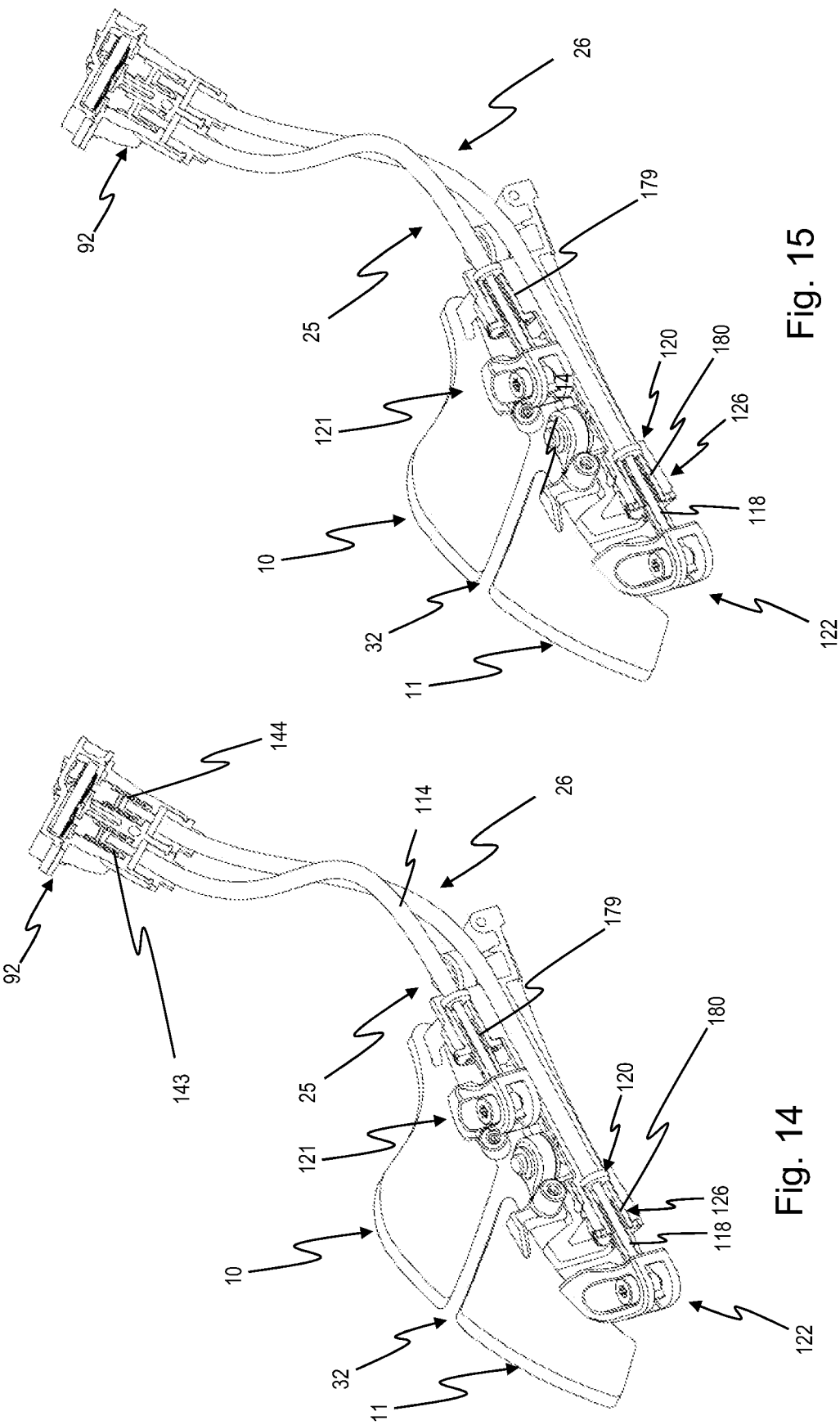

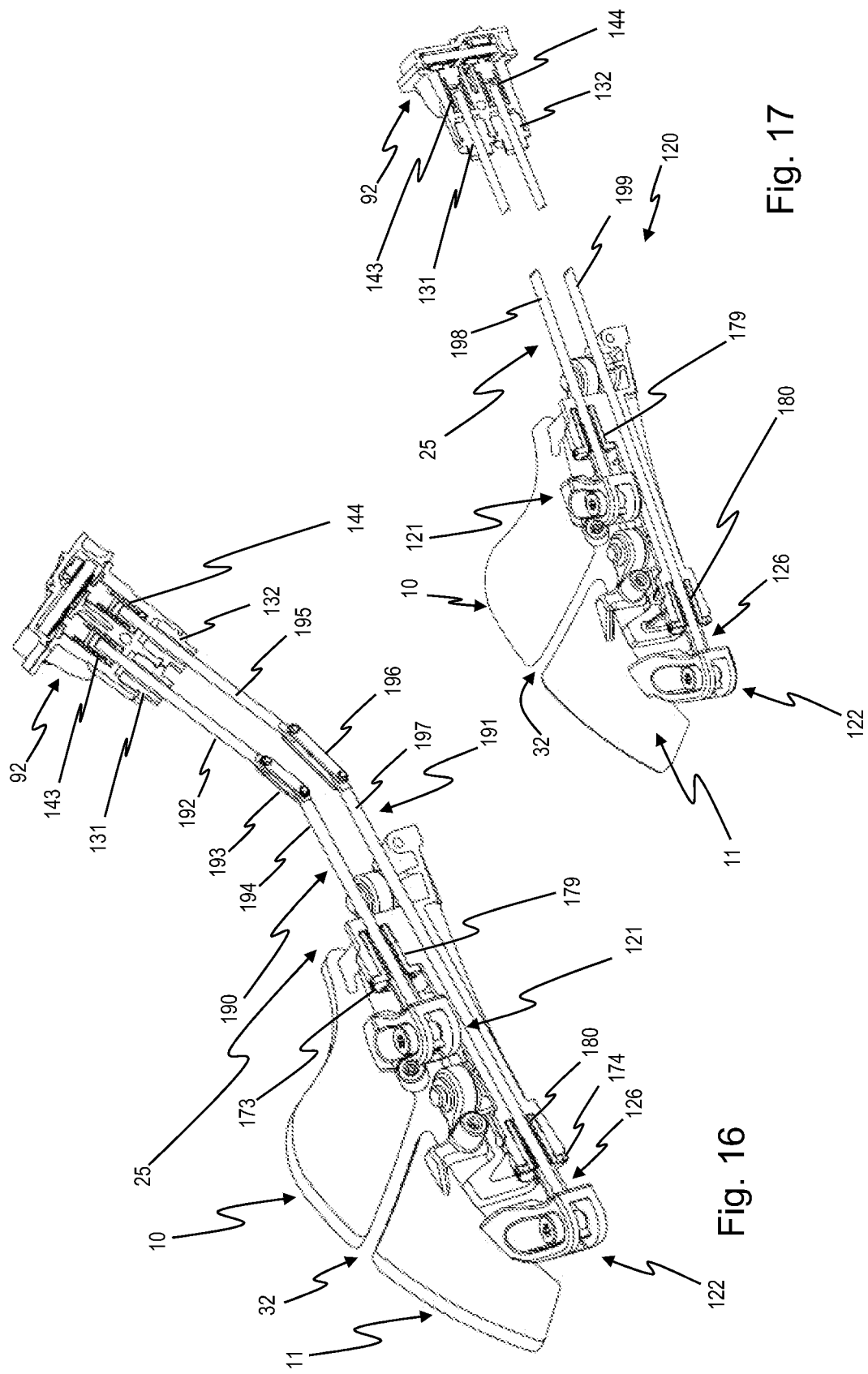

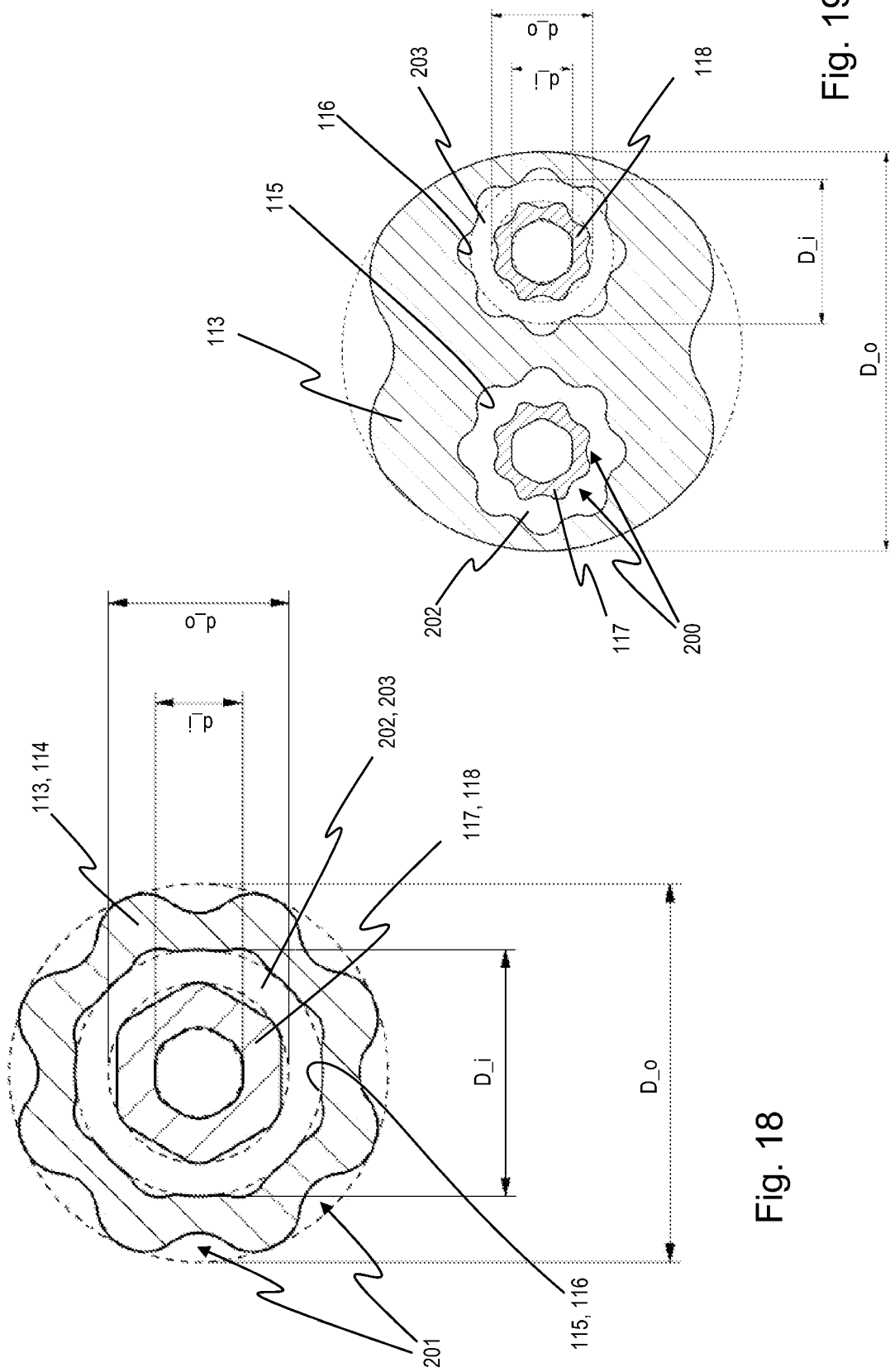

MANUAL CONTROL DEVICE FOR A BICYCLE

CROSS REFERENCE TO RELATED APPLICATIONS

This application claims the benefit of Italian Patent Application No. 102021000019979, filed on Jul. 27, 2021, which is incorporated herein by reference as if fully set forth.

FIELD OF INVENTION

The invention relates to a manual control device for a bicycle, as well as an electronic bicycle system comprising it. Term "manual" will be omitted hereinbelow for the sake of brevity.

BACKGROUND

Control devices are used to issue one or more commands to one or more mechanical and/or hydraulic and/or pneumatic and/or electromechanical and/or electro-electronic equipment of the bicycle, such as a brake associated with a wheel, a gearshift associated with the hub of the rear wheel, a derailleur associated with the bottom bracket spindle, a suspension, a saddle setting adjuster, a lighting system, a satellite navigator, a training device, an anti-theft device, a cycle computer capable of providing information on the status of the bicycle, the cyclist and/or the route, etc.

The known control devices for a bicycle comprise one or more manual actuation members, of the lever type, namely actuated with a rotary movement, or of the pushbutton type, namely actuated with a linear movement, actuatable with one finger or with plural fingers. Manual actuation members capable of issuing two or more different commands according to the direction and/or magnitude of the movement and/or of a duration thereof and/or of its repetition are also known.

Typically, one or more manual actuation members are supported by a support body suitable for attachment to the bicycle, in proximity or at a grip portion of the handlebars or of the forward protruding rest bars in the specialized handlebars for speed races (so-called "bar-end" control devices), or in other positions of the handlebars or of the frame.

The so-called "integrated" control devices comprise one to three manual actuation members in charge of controlling a brake and the gear ratio, besides possibly one or more manual actuation members in charge of controlling other equipment. In the present description and the attached claims, under the expression "gear ratio" it is generally meant to encompass one or more of the following, unless otherwise indicated:

- the gear ratio between the bottom bracket spindle and a looped transmission element, in particular a chain or a belt,
- the gear ratio between the looped transmission element and the hub of the rear wheel,
- the overall gear ratio between the bottom bracket spindle and the hub of the rear wheel (controllable for example with some types of electronics).

In some cases, the controlled equipment directly responds to the manual force issued through the control device, such as for example in the case of mechanical brakes and gearshifts actuated through a Bowden cable or other sheathed cable; in other cases the manual force is amplified through the use of a hydraulic fluid, such as for example in the case of hydraulic brakes or hydraulic suspensions; in still other cases, an electric motor is used, such as for example in the case of electronic gearshifts, and the manual action is limited to control of an electric switch.

In the case of a control device at least partly electric/electronic, the control device may contain part of or all the electric and/or electronic components for processing the issued signals, and it may be connected via cable or wireless with the controlled piece or pieces of equipment, directly or through a central processing unit, a cycle computer or a smart-phone or other general purposed device provided with a suitable app.

In the present description and the attached claims, adjectives like "proximal", "distal", "upper", "lower", "right", "left" refer to the mounted condition of the control device on the bicycle. In particular, "proximal" is used to indicate closer to the center of the handlebars, facing the center of the handlebars, and the adjective "distal" is used to indicate farther from the center of the handlebars, facing away from the center of the handlebars. Vice versa, adjectives "inner" and "outer" are used with reference to the control device itself: "inner" is used to indicate closer to the center of the control device and adjective "outer" is used to indicate farther from the center of the control device.

Electronic control devices for a bicycle generally comprise one or more push-operated switches, typically of the micro-switch type or of the type including a deformable dome-shaped diaphragm. For switching the switch in order to issue the electric-electronic commands, a region of a manual actuation member is usually adjacent to the switch—for example adjacent to the deformable diaphragm—in the rest condition of the manual actuation member, and acts by pushing thereonto in the actuation condition of the manual actuation member.

Electronic integrated control devices for curved bicycle handlebars are known wherein at least one manual actuation member for controlling a switch is in the form of a lever arranged behind the brake lever.

Such a lever for actuation of the switch has to be articulated about a pivot axis parallel to that of the brake lever in order to be movable therewith, as well as about a pivot axis orthogonal to that of the brake lever for the movement for actuating of the switch, which is usually borne by a PCB housed within the support body; this dual articulation requires a complex mechanics.

To obviate thereto, in some control devices, the switch is fixed to the brake lever and the switch control lever is pivoted on the brake lever. In this case, the problem arises to electrically and tightly insulate the switch; furthermore, the electric connection wires extend between the switch and the support body and their electric conductors are subject to a deterioration because of the movement of the brake lever.

The technical problem at the basis of the invention is to provide an electronic integrated control device for a bicycle which overcomes the above indicated drawbacks.

SUMMARY

The invention relates broadly to an electronic control device for a bicycle having a body that has a push-operated switch, a manual actuation member for issuing a command, and a motion transmission device interposed between the manual actuation member and the switch. The motion transmission device includes a guide element which is provided with a filiform through cavity and has a first end fixed in proximity to the manual actuation member and a second end fixed in proximity to the switch. A longitudinally (substantially) incompressible filiform body has a first end pushed by actuation of the manual actuation member and a second end that pushes on the switch. Due to the motion transmission device, the switch may be housed within the electronic control body where the electric and tight insulation thereof can be made more conveniently, and the actuation member may be arranged where it is more ergonomic. In the case of an integrated control device for curved handlebars, it is possible to house the switch within the electronic control body and control it through a control lever articulated on the brake lever, thus avoiding the dual articulation of the control lever.

The invention relates, in an aspect thereof, to an electronic control device for a bicycle, comprising:
- a support body configured for attachment to the bicycle handlebars,
- at least one push-operated switch housed within the support body, and
- at least one manual actuation member actuatable for switching the switch in order to issue a command.

The control device may comprise a motion transmission device operatively interposed between the manual actuation member and the switch, wherein said motion transmission device comprises:
- a guide element provided with a filiform through cavity, the guide element having a first end fixed in proximity to a driven region of the manual actuation member and a second end fixed in proximity to the switch, and
- a filiform body substantially longitudinally incompressible and slidingly guided within the guide element, the filiform body having a first end directly or indirectly pushed by the driven region of the manual actuation member during actuation thereof and a second end which acts by directly or indirectly pushing on the switch.

Through the motion transmission device, the switch may be housed within the support body where the electric and tight insulation thereof can be made more conveniently, arranging the actuation member where it is more ergonomic. In the case of an integrated control device for curved handlebars, for example, it turns out to be possible to house the switch within the support body and control it through a control lever articulated on the brake lever, thus advantageously avoiding a dual articulation of the control lever.

The manual actuation member may be a control lever.

The switch may be of the deformable dome-shaped diaphragm type.

Between the filiform body and the guide element there may be a clearance.

The clearance may be less than the maximum cross size of the filiform body.

The filiform body and the guide element may have a flexural rigidity module $E<=20$ GPa.

Between the filiform body and the guide element there may be a friction coefficient $Mu<=0.8$.

The filiform body may have a curvilinear cross-section so as to have longitudinal grooves, or a cylindrical cross-section, or a polygonal cross-section.

The cross-section of the filiform body may be solid or hollow.

When the filiform body has a hollow cross-section, the cross-section shape of the cavity may be the same as the cross-section shape of the mantle or not.

The filiform body may be formed by a plurality of elements aligned along the through cavity of the guide element.

The elements of said plurality may be selected from the group comprised of spheres, cylinders, disks, and prisms.

The guide element may be shared by two or more motion transmission devices provided between two or more switches and the respective manual actuation members, having two or more side-by-side through cavities.

The guide element may have a cylindrical or polygonal or curvilinear cross-section.

The cross-section shape of the cavity of the guide element may be the same as the cross-section shape of the mantle or not.

The manual actuation member of the control lever type may have a cam surface, and the first end of the filiform body may be operatively associated with a cam follower operatively associated with the cam surface.

Through the provision of the cam surface, a movement of the control lever large enough to be perceived by the cyclist may be allowed, also when the movement of the filiform body or in general the movement for actuating the switch by pushing it has to be small; furthermore because such a large enough movement of the control lever is necessary, small oscillations of the manual control lever, caused by vibrations or small movements of the cyclist's hand or fingers, do not entail any involuntary actuation of the switch.

The presence of the cam surface makes the entity of the linear displacement of pushing on the switch independent of the magnitude of the lever arm, of its angular stroke, and of the position of the fulcrum with respect to the switch.

The second end of the filiform body may be operatively associated with a pusher acting by directly or indirectly pushing on the switch, possibly against the action of a return spring.

The pusher may act by pushing on the switch through a second pusher.

In the rest condition of the manual actuation member, there may be at least one gap between the driven region of the manual actuation member and the switch.

The electronic control device may be configured for attachment to a curved bicycle handlebars (of the so-called "drop bar" type) and may further comprise a brake lever for controlling the brake, articulated at an upper end thereof, the pivot axis of the brake lever being substantially horizontal and forward with respect to the handlebars in the travel direction, so that the brake lever is actuated by pulling it towards the curved end of the handlebars, the manual actuation member being articulated with the brake lever.

The manual actuation member may be articulated behind the brake lever.

The manual actuation member may be articulated with the brake lever.

The filiform body and the guide element may have enough flexibility to follow the movements of the brake lever.

BRIEF DESCRIPTION OF THE DRAWINGS

Further features and advantages of the invention will be better highlighted by the description of preferred embodiments thereof, made with reference to the attached drawings, wherein:

FIG. 1 shows a control device, lacking a cover sheath and in a view from a distal side thereof, FIGS. 1A and 1B show cross-sections along planes A-A and B-B of FIG. 1, FIG. 2 shows the control device of FIG. 1, lacking the cover sheath and in a view from a proximal side thereof, FIG. 3 shows the control device of FIG. 1, provided with the cover sheath and in a view from its proximal side, FIG. 5 shows an isometric view of some components of the control device of FIG. 1, FIG. 6 shows an isometric view of another component of the control device of FIG. 1, FIG. 7 is a partial view of the support body of the control device of FIG. 1, partially cut-away, and of some assembled components thereof, FIG. 8 is a partial view of the support body of the control device of FIG. 1, partially cut-away, and of some assembled components therein, FIGS. 14-17 show some variants of a subset of components of the control device of FIG. 1, FIG. 18 is a cross-sectional view through some components of the control device of FIG. 1, and FIG. 19 is a cross-sectional view through some alternative components of the control device of FIG. 1.

DETAILED DESCRIPTION OF THE PREFERRED EMBODIMENTS

Figure 4:
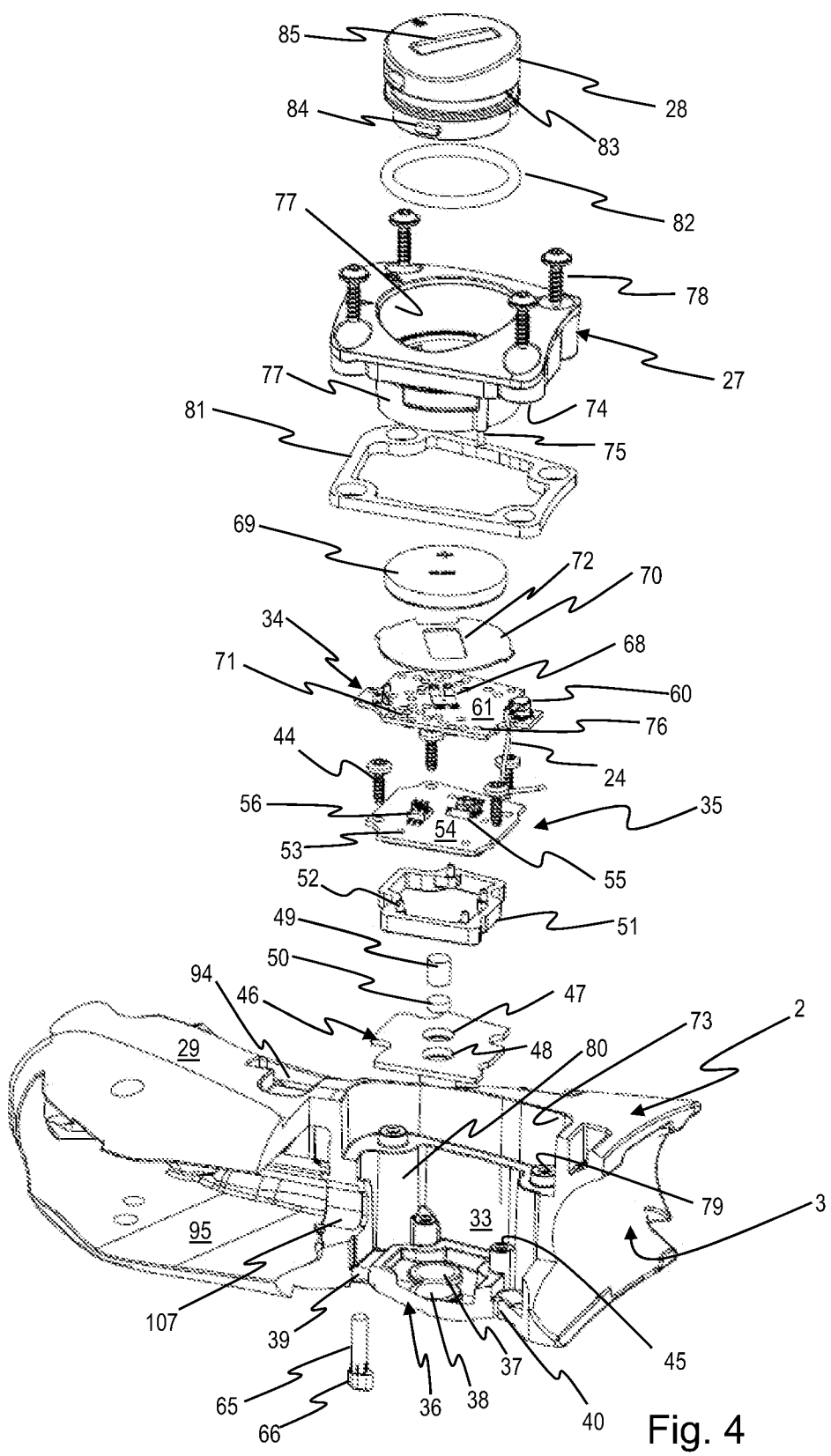
FIG. 4 shows a support body of the control device of FIG. 1 partially broken away and some other components of the control device, in an exploded view.

In FIGS. 1-3 there is shown a control device 1 according to a merely illustrative and not limiting embodiment of the invention. All the components described below are to be understood as optionally present in the control device 1, unless otherwise indicated.

In the case shown, it is a left control device, a right control device being the mirror image thereof.

In the case shown, it is a control device for curved handlebars, so-called of the "drop-bar" type, or for racing bicycles.

In the case shown, it is a control device of the electronic type.

In the case shown, it is a wireless control device.

The control device 1 comprises a support body 2, configured, in the case shown, for attachment to the bicycle handlebars. In the case of the control device for curved handlebars shown, the support body 2 is attached at its rear region 3, so as to protrude forward in the travel direction from the convex grip region of the handlebars, in a manner per se well known. The support body 2 may also be gripped by the cyclist instead of the handlebars, resting his/her hand palm on its upper region 4.

The control device 1 shown is, by way of an example, of the integrated type, in charge of controlling a brake and the gear ratio.

The control device 1 shown is, moreover, by way of an example, in charge of emitting further commands, as better described hereinbelow.

The control device 1 may comprise, as shown, a manual actuation member in the form of a brake lever 5, for controlling the brake, articulated at an upper end thereof, the pivot axis 6 of the brake lever 5 being substantially horizontal and forward with respect to the handlebars in the travel direction, so that the brake lever 5 is actuated by pulling it towards the curved end of the handlebars, namely generally toward the rear region 3 of the support body 2, as shown by arrow X.

In FIG. 1 a hydraulic tank 9 of the braking system is visible, but the braking system is not necessarily of the hydraulic type.

The control device 1 may comprise, as shown, a pair of manual actuation members in the form of control levers 10, 11 in charge of controlling a gear ratio, preferably, in the case of the left control device shown, for controlling the gear ratio between the bottom bracket spindle and a looped transmission member, in particular a chain or a belt.

The control levers 10, 11 are articulated, for example, at an upper end of the control levers 10, 11.

The control levers 10, 11 have a respective control region 12, 13, intended for applying the manual force, in the case shown arranged behind the brake lever 5, namely rearward with respect to the brake lever 5 in the travel direction.

The control levers 10, 11 are actuated, for example, by pushing them generally in the distal to proximal direction, as shown by arrows Y, Z. In this case, the control levers 10, 11 are movable between a rest position behind the brake lever 5, namely rearward with respect to the brake lever 5 in the travel direction, and an actuation position proximal with respect to the rest position.

In the case shown of an electronic control device, for controlling a derailleur or gearshift or other electric-electronic equipment, the control levers 10, 11 control the closure of a respective switch, not visible in FIGS. 1-3; in other cases, the control levers 10, 11 may be provided for issuing one or more commands to one or more mechanical and/or hydraulic and/or pneumatic and/or electromechanical pieces of equipment, and for example they may control the traction of sheathed cables, the push of pistons or something else.

The control device 1 may comprise, as shown, a pair of manual actuation members in the shape of push-buttons 16, 17 which control the command, for example the closing, of a respective switch, not visible in FIGS. 1-3, and which are in charge of, for example, issuing commands to electronics of a controlled equipment, in particular to the electronics of the front derailleur in the case of the left control device shown, of the gearshift in the case of the right control device.

The control device 1 may comprise a luminous indicator 18 as output interface device with the user.

The push-buttons 16, 17 and the luminous indicator 18 are arranged, for example, on the proximal face 19 of the support body, so as to be easily accessed by the cyclist's thumb, and in a position visible by the cyclist.

A sheath 20, shown in FIG. 3, may cover part of the support body 2. The sheath 20 has regions 21, 22 with greater flexibility, for example thinner, or holes at the push-buttons 16, 17, as well as a hole 23 at the luminous indicator 18, if provided for.

The control device 1 may comprise a coaxial cable 24 having an antenna function for wireless communication with one or more pieces of equipment controlled by the control device 1 and/or with other electronic devices. The coaxial cable 24 has for example the function of a quarter wave antenna.

The coaxial cable 24 may extend to the outer surface of the support body 2 and may also have an end portion 24a extending thereonto.

The coaxial cable 24 may extend to—and possibly with the end portion 24a on—the proximal face 19 of the support body 2.

The coaxial cable 24 may arrive—and its end portion 24a may extend—in a position not involved by the cyclist's hand and/or fingers during the normal grip of the support body 2 or of the handlebars.

In FIGS. 2-3, motion transmission devices 25, 26 are also partially visible, which may be interposed between the control levers 10, 11 and respective switches, not visible in those figures.

The possible switches controlled by the manual actuation members 10, 11, 16, 17 are housed within a cavity of the support body 2, the closure of which is shown in FIG. 1, made for example through a frame-like cover 27 and a cover 28 inserted therein, which also serves for fixing a battery for powering the electric/electronic components housed within the cavity of the support body 2. The cover 28 is, for example, arranged on the distal face 29 of the control device 1, so that the battery may be easily accessible for replacement.

The distal face 29 may also bear a service opening closed by a cover 30.

The control regions 12, 13 of the control levers 10, 11 may be arranged one above the other as shown. For example, the control lever 10 having the upper control region 12 is intended for applying the manual force with a forefinger, and the control lever 11 having the lower control region 13 is intended for applying the manual force with a middle finger. For example, the control lever 10 having the upper control region 12 is intended for emitting an upshift command and the control lever 11 having the lower control region 13 is intended for emitting a downshift command. The cyclist's finger may therefore "specialize" and an involuntary actuation is avoided.

The control regions 12, 13 may have a different surface texture so as to allow them to be distinguished by the feel.

Furthermore, because there are two independent control levers 10, 11, the respective pivot point may be optimized, so as to better exploit the lever effect during actuation.

The control regions 12, 13 may be separated by a slit 32.

The slit 32 may extend, slanted downwards, substantially along a direction 32a forming an angle comprised between 15° and 60° with the longitudinal direction 8 of the brake lever 5, preferably an angle comprised between 25° and 55°, more preferably an angle comprised between 35° and 50°.

The longitudinal direction 8 of the brake lever 5 is defined by a line tangent to the rear edge 7a of a distal face 7 of the brake lever 5 and intersecting the pivot axis 6 of the brake lever 5.

The control regions 12, 13 may extend on one and a same plane as shown, or on a curved surface having a constant or uniformly changing radius of curvature, so that between the two control regions there is no sharp transition. However, this is not strictly necessary.

The control regions 12, 13 start preferably both from the rear edge 7a of the distal face 7 of the brake lever 5; alternatively, they could be one rearward with respect to the other one.

With reference also to FIGS. 1A and 1B, the control regions 12, 13 may extend on surfaces which, at the rear edge 7a of the brake lever 5, are tangent to the distal face 7 of the brake lever 5.

In the control device 1 shown, the upper control region 12 is comparatively short and wide and the lower control region 13 is comparatively tall and narrow, even though this is not strictly necessary. Because the brake lever 5 is usually slanted towards the handlebars, by so shaping the control regions 12, 13 it is possible to make their distance from the handlebars substantially equal.

The control regions 12, 13 of the control levers 10, 11 provided behind the brake lever 5 may however have configurations and/or positions even remarkably different from those shown; manual actuation members different from control levers, for example of the push-button type, may also be provided for, in order to actuate the possible switches which, in the case of the control device 1 shown, are actuated by the control levers 10, 11, or to send non-electric commands; control levers or other manual actuation members behind the brake lever 5 may also be lacking altogether, only control manual actuation members or push-buttons on the support body 2 being provided for.

As mentioned, the control device 1 may comprise a plurality of switches and/or other electric/electronic components, among which for example also a wireless communication device.

With reference also to FIGS. 4-9, a plurality of electric/electronic devices may be housed within the support body 2.

Said plurality of electric-electronic devices may be distributed on at least two printed circuit boards, PCBs 34, 35. The two PCBs 34, 35 of a pair of said PCBs may be parallel to and spaced from each other. In this way, the two PCBs may for example be housed within a cavity 33 of the support body 2, which may have a comparatively small cross size, with respect to the extent of the support body 2.

The two PCBs 34, 35 of the pair of PCBs may be electrically connected to each other, for example as discussed hereinbelow.

The electro-electronic devices borne by the PCBs 34, 35 of the pair of parallel and spaced PCBs may represent the most or even the totality of the electric/electronic components of the control device 1.

However, other electro-electronic devices may be borne by one or more other PCBs, for example on a third PCB not parallel to the PCBs of the pair as will be described for example hereinbelow with reference to FIG. 11, or also directly fixed for example to the support body.

The cavity 33, which closure has already been discussed above, may open on the distal face 29 of the support body 2.

The cavity 33 may extend from the distal face 29 of the support body 2, to in proximity to the proximal face 19. The bottom 36 of the cavity 33 may have through holes or openings 37, 38, 39, 40, respectively at the control push-buttons 16, 17, at the luminous indicator 18, and for the passage of the coaxial cable 24, if provided for.

One of the two PCBs, hereinbelow named auxiliary PCB 35, bears, on its proximal face 41 (shown in FIG. 5) facing toward the bottom 36 of the cavity 33, and in positions corresponding to the holes 37, 38, switches 42, 43 respectively controlled by the control push-buttons 16, 17. The auxiliary PCB 35 is fixed in proximity to the bottom 36 of the cavity 33, for example through screws 44 in threaded blind holes 45.

A flexible diaphragm 46, for example made of silicone, may be interposed between the auxiliary PCB 35 and the bottom 36 of the cavity, in order to ensure hermetic tightness. The diaphragm is so seated as to let the holes 39, 40 for the luminous indicator 18 and for passage of the coaxial cable 24 free, if provided for.

The diaphragm 46 may have recessed seats 47, 48 at the holes 37, 38 and at the switches 42, 43, if provided for, open towards the auxiliary PCB 35, within which rigid pushers 49, 50 are housed.

The diaphragm 46 with the rigid pushers 49, 50 embodies the manual actuation members or control push-buttons 16, 17.

A spacer 51 may be fixed to the proximal face 41 of the auxiliary PCB 35 about the switches 42, 43, for example trough press fitting protrusions 52 thereof into holes 53 of the auxiliary PCB 35, in order to keep the diaphragm 46 and the rigid pushers 49, 50 spaced from the switches 42, 43 in the rest condition of the control push-buttons 16, 17; furthermore, the spacer 51 allows tightness through compression of the diaphragm 46 towards the bottom 36 of the cavity 33.

A pusher 49 may have a greater height than the other pusher 50 so that the control push-button 16 protrudes from the proximal face 19 of the support body 2 so as to promote actuation thereof, and so that the control push-button 17 is flush with the proximal face 19 or is recessed in the proximal face 19 so as to avoid an involuntary actuation thereof. The protruding control push-button 16 is intended for the input of commands during the ordinary use of the bicycle, for example it is a push-button for selecting an operating mode of the controlled equipment ("mode" push-button), while the control push-button 17 is intended for example for the input of setting commands.

The control push-button 17 may be intended for switching some or all the electric/electronic components on and off, through disconnection of the power supplied by the battery which, as mentioned, may be fixed to the cover 28 on the distal face 29 of the support body 2, and which will be better described hereinbelow. This provision allows energy to be spared, also when the electronics is provided with a low consumption mode, so-called sleep or standby mode, and is awaken thus returning to be fully operative, namely in a full operation operating mode, for example through a movement sensor, for example an accelerometer, while it enters the low consumption mode in the absence of movement and/or after a certain period of time, for example. This provision is particularly useful in the case of a control device 1 provided with a wireless communication module, because the latter has remarkable consumption. The provision of an on/off push-button on an electronic control device provided with a wireless communication module and/or provided with a low consumption mode is innovative per se, irrespectively of the presence or absence of other innovative features of the subject-matter disclosed herein.

With reference also to FIG. 7, the distal face 54 of the auxiliary PCB 35, facing toward the bottom 36 of the cavity 33, may have a connector 55 for coupling with a matching connector (106) connected to switches controlled by the control levers 10, 11, if provided for as better described hereinbelow. The connector 55 may be of the snap-type, for example a connector of the EZ-mate type. The connection may however be made through soldering.

The distal face 54 of the auxiliary PCB 35 may have a connector 56 for coupling with a matching connector 57 provided on the proximal face 58 of the main PCB 34, visible in FIG. 6 and facing toward the bottom 36 of the cavity 33. The connectors 55, 56 may be of the snap-type, for example of the pin strip type.

The provision of the connectors 55, 56 aids the mounting operations and also serves as a mutual mechanical connection of the two PCBs 34, 35, avoiding vibrations and risks of collision of the components, as well as a spacer, thus ensuring the aeration of the electric-electronic components on the PCBs 34, 35. The connection may however be made through soldering.

The proximal face 58 of the main PCB 34 may also bear a wireless communication module 59, for example according to the BlueTooth or ANT+ protocol. The module may have an integrated microcontroller.

The wireless communication module 59 is typically provided with an internal antenna. In order to avoid that the cyclist's hand screens the antenna, the above-mentioned coaxial cable 24 may be provided for, having an antenna function. The coaxial cable 24 may be connected with the wireless communication module 59 through a coaxial connector 60 provided for example on the distal face 61 of the main PCB 34 and connected with the wireless communication module 59 through, for example, a printed connection through the main PCB 34.

The coaxial cable 24 may extend to—and possibly also with its end portion 24a extending on the—outer surface of the support body 2, for example on its proximal face 19, as mentioned above. For example, the coaxial cable 24 may pass next to the auxiliary PCB 35, to the spacer 51 and to the diaphragm 46 within the cavity 33 and through the through hole 40 on the bottom 36 of the cavity 33.

The coaxial cable 24 may extend to the outer surface of the support body 2 in a region of the support body 2 which, in a mounted condition of the control device 1 on the handlebars or in general on the bicycle, substantially faces an intended position for a wireless communication module with which said wireless communication module 59 is intended to communicate, for example with a wireless communication module of a controlled equipment such as a derailleur or a gearshift, or of another electronic device, such as a cycle computer, a smartphone or similar, arranged in a central region of the handlebars. The end portion 24a of the coaxial cable 24 may extend in said region.

The control device 1 and said controlled equipment or other electronic device form a bicycle electronic system.

With reference also to FIG. 8, the end portion of the coaxial cable 24 is for example housed in a groove 62, correspondingly sized, one end of which may communicate with the hole 40. The coaxial cable 24 thus turns out to be force fitted, or in any case without any substantial possibility of movement within the groove 62, so as to remain in the intended position.

The groove 62 may be made in a recess 63 of the outer surface of the support body 2, larger than the groove 62, provided for example to house a film made of adhesive plastic material (not shown) for retaining the coaxial cable 24. The recess 63 may be sized correspondingly to the film. These details have been omitted from FIG. 2 for the sake of clarity.

The proximal face 58 of the main PCB 34 may also bear a light source 64, for example an LED. A light guide 65 may extend between the light source 64 and the through hole 39 on the proximal face 19 of the support body 2. A light diffuser 66 or gem may be provided for at the through hole 39. The light source 64, the light guide 65 and the light diffuser 66 embody said luminous indicator 18, if provided for.

The distal face 61 of the main PCB 34 may also bear electric contacts 68 for a battery 69, for example a button battery.

A screen 70 may be coupled on the distal face 61 of the main PCB 34, in order to hide the main PCB 34 from view and protect any test points 71 provided on said distal face 61. A through aperture 72 is provided on the screen 70 at the passage of the electric contacts 68.

The main PCB 34, with the possible screen 70 coupled thereto, may be fixed to the proximal face 74 of the frame-like cover 27 which partially closes the mouth 73 of the cavity 33, for example through force fitting protrusions 75 of the frame-like cover 27 in holes 76 of the main PCB 34.

A through seat 77 for the battery 69 may be provided for in the frame-like cover 27, for example it may protrude from the proximal face 74 of the frame-like cover 27.

The frame-like cover 27 is fixed in the peripheral region of the mouth 73 of the cavity 33, for example through screws 78 in threaded blind holes 79 made in posts 80 upright from the bottom 36 of the cavity 33. A frame-like gasket 81 may be interposed between the frame-like cover 27 and the posts 80 in order to ensure tightness.

The main PCB 34 turns out to be fixed in an intermediate position of the cavity 33—while, as above mentioned, the auxiliary PCB 35 may be fixed in proximity to the bottom 36 of the cavity 33—and therefore in proximity to the proximal face 19 of the support body 2 in the case shown.

The above-mentioned cover 28 of the battery 69 closes the through seat 77 or opening of the frame-like cover 27 holding the battery 69 in its seat. An O-ring 82 may be provided for in order to ensure the tightness between the cover 28 and the frame-like cover 27. A seat 83 for the O-ring 82 may be provided for in the cover 28 of the battery 69.

The cover 28 presses the battery 69 onto the electric contacts 68, holding it against the main PCB 34. If the electric contacts 68 are of the flexible blade type, they elastically deform and aid the ejection of the battery 69 for its replacement.

The cover 28 of the battery 69 is, for example, of the bayonet type, two snapping lugs 84 being visible in FIG. 4. The cover 28 of the battery is, for example, provided with a groove 85 for inserting an actuation coin.

The arrangement of the cover 28 of the battery 69, in general of the mouth 73 of the cavity 33, on the distal face 29 of the control device 1 aids the replacement of the battery 69 because this is easily accessible.

Figure 9:
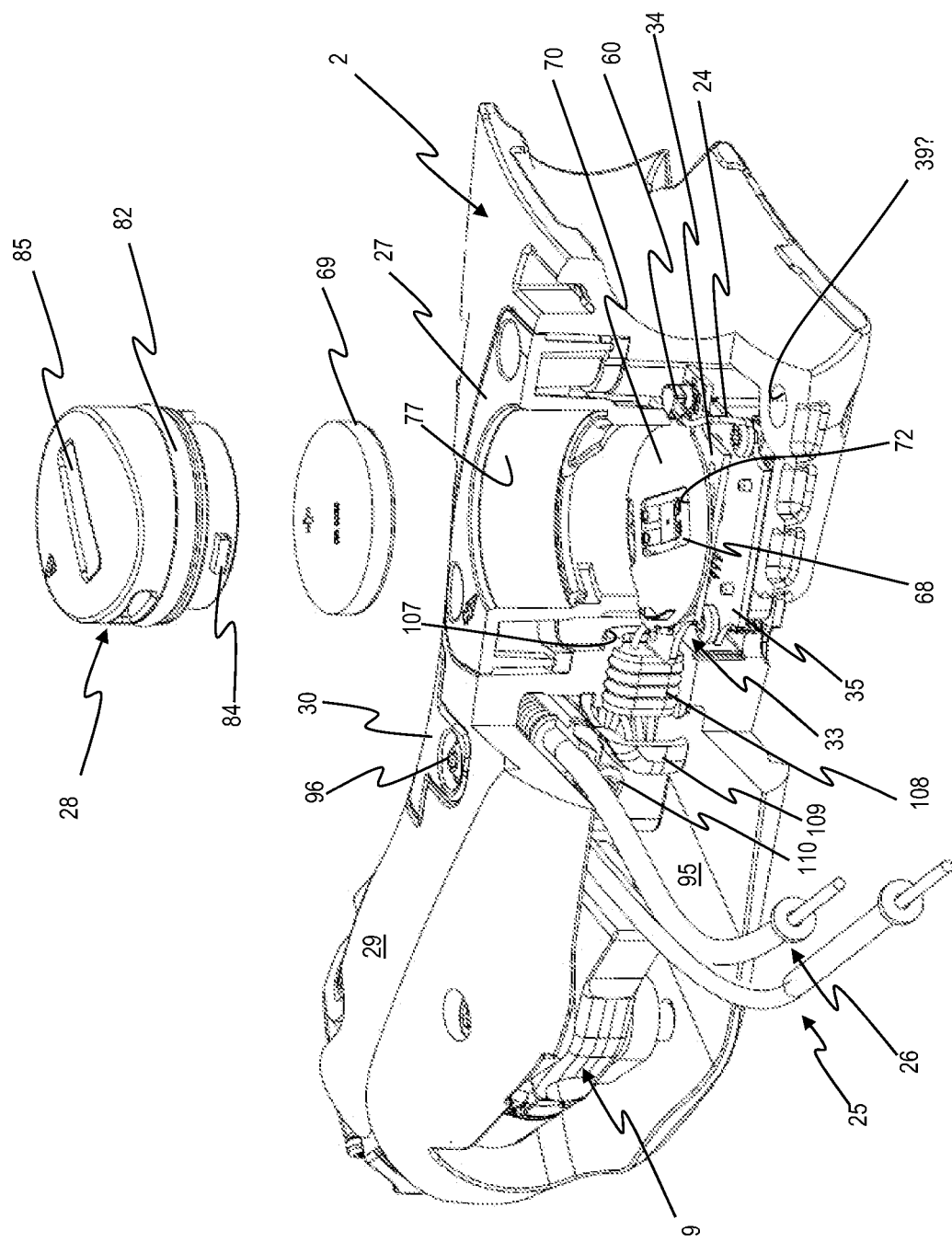
FIG. 9 shows the support body of the control device of FIG. 1, partially cut-away, and of some assembled components therein.

FIG. 9 shows a detail of the support body 2 in a cut-away view at the cavity 33, making the mounting condition of the components housed therein evident, including the frame-like cover 27, while the battery 69 is shown broken away from its seat and the cover 28 is also shown broken away, provided with the O-ring 82.

In FIG. 7, which also shows a detail of the support body 2 in a cut-away view at the cavity 33, the mounting condition of all components housed therein is evident.

It will be understood that the arrangement of the various electric/electronic components on the two PCBs 34, 35 may vary also remarkably from what shown, that some of them may be omitted, and vice versa other electric/electronic components may be provided for.

However, it is highlighted that the provision of the two parallel and spaced PCBs 34, 35 not only allows to have a lot of space available for the electric/electronic components, and therefore allows their number to be increased, but it also allows the various electric/electronic components to be placed in the most suitable position of the support body 2, in proximity to suitable regions of its exposed surface.

In the control device 1 shown, the two PCBs 34, 35 are parallel to the proximal face 19 and to the distal face 29 of the support body 2, but alternatively they may be parallel to a lower and an upper face of the support body 2, or they may be parallel to a front and a rear face of the support body 2, or have another configuration with respect to the support body 2.

It will be understood that in the case of a control device not intended for curved handlebars, rather intended for straight handlebars or so-called T-bar, or for a resting bar protruding forward of handlebars specialized for speed races ("bar-end" control device), or for a control device intended for attachment to the bicycle frame, the provision of the two PCBs 34, 35 may still turn out to be convenient. In those cases, the two PCBs may still be parallel to a distal and a proximal face of the support body, or they may be parallel to a lower and an upper face of the support body, or they may be parallel to a front and a rear face of the support body, or may have another configuration with respect to the support body, the criteria for placing the two PCBs in the support body and for distributing the various electric/electronic components on the two PCBs being manifest to those skilled in the art in the light of the above description.

With reference also to FIGS. 10-13, as above mentioned, in the case shown of electronic control device 1, for controlling a derailleur or a gearshift or other electric-electronic equipment, the control levers 10, 11 control the closure of a respective switch 90, 91.

Between the control levers 10, 11 and the switches 90, 91, motion transmission devices 25, 26 can be interposed, as above mentioned. In this way it is possible to arrange the switches 90, 91 on the support body 2, where the electric and tight insulation may be made more conveniently, while the control levers 10, 11 may be arranged where it is more ergonomic, for example behind the brake lever 5. Through the transmission devices 25, 26 it is not necessary, still being possible, to articulate the control levers 10, 11 with the support body 2 and provide them with a dual articulation in order to allow them to follow the movement of the brake lever 5. On the contrary, it is possible for example to articulate the control levers 10, 11 on the brake lever 5, as better described hereinafter.

The switches 90, 91 may be housed, together with other components better described hereinbelow, in a switch case 92 tightly closed by a cover 93, for example of the snapping type.

With reference also to FIGS. 4 and 9, the switch case 92 may be housed within the support body 2, in a service opening 94 extending through the support body 2 from a recess 95 thereof adjacent to the cavity 33. The recess 95 may be also provided for housing the mechanics actuated by the brake lever 5 and the hydraulic tank 9 controlled thereby, if provided for.

The switch case 92 may be fixed to the support body 2 for example through a screw (not shown) extending between a hole 96 of the above-mentioned cover 30, which closes the service opening 94, a hole 97 of the case 92 and a hole (not visible) of the support body 2.

Figure 10:
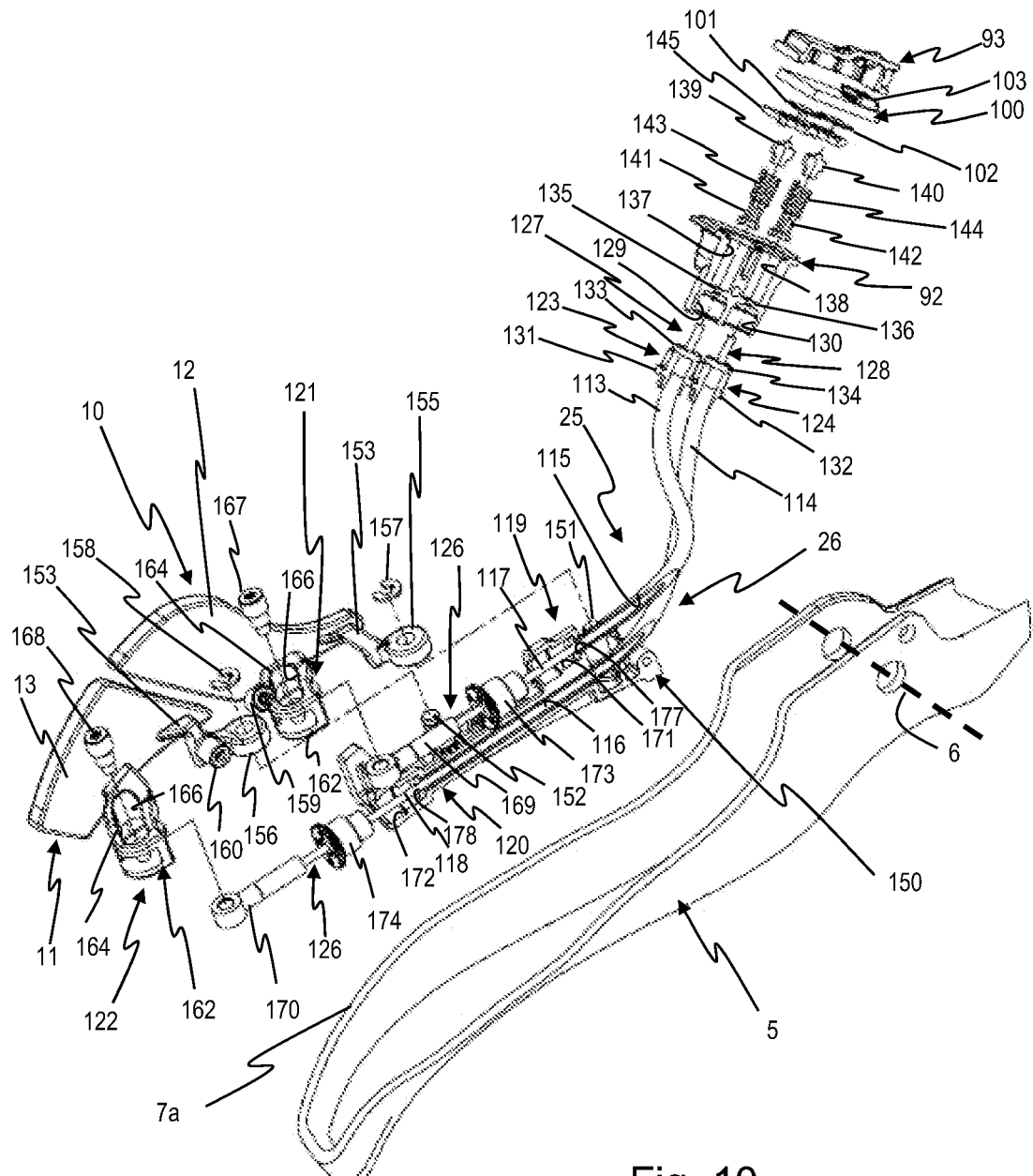
FIG. 10 shows some components of the control device of FIG. 1, in an exploded and partially cut-away view.
Figure 11:
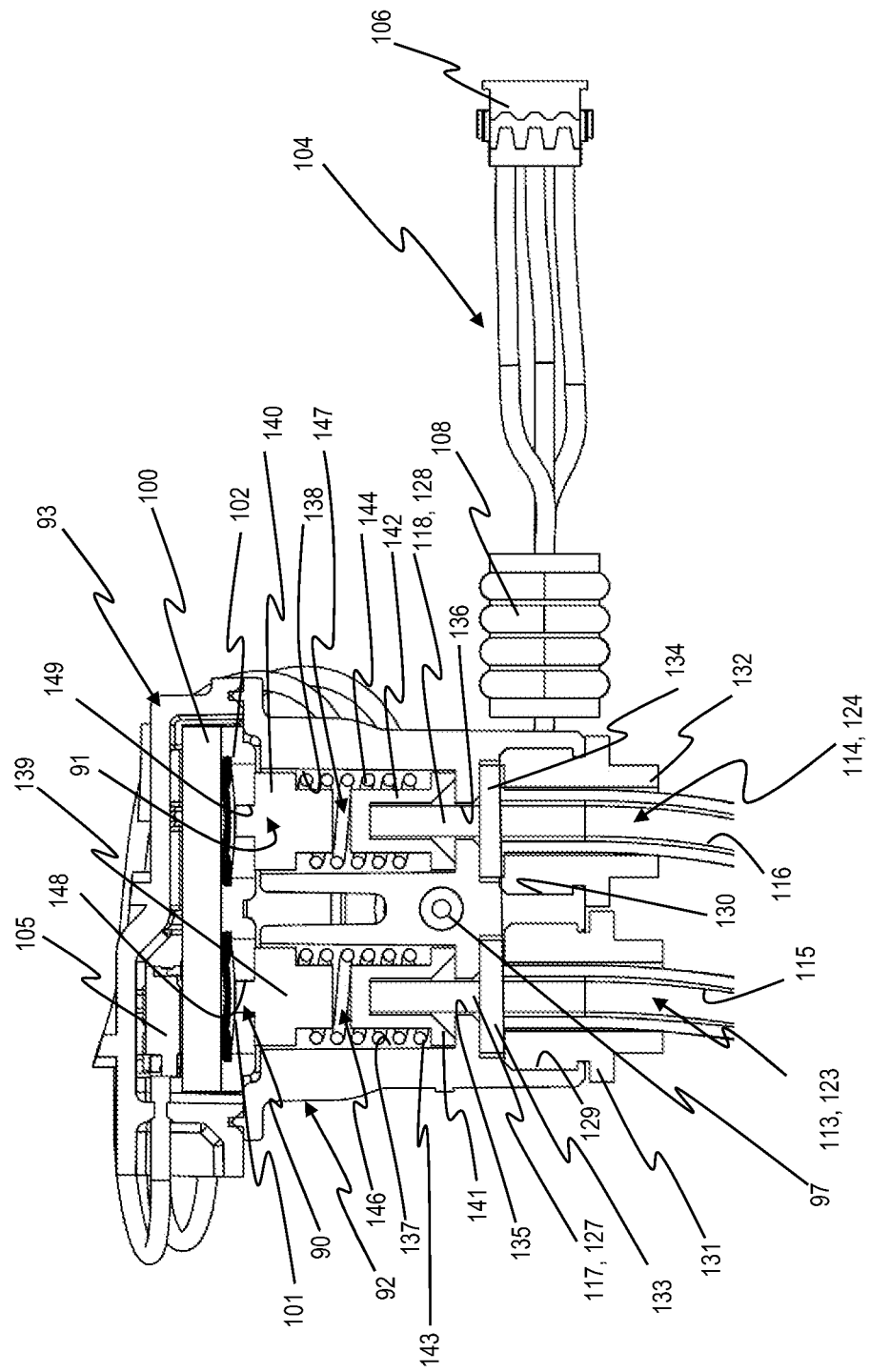
FIG. 11 shows a cross-sectional view through some components of the control device of FIG. 1, FIGS. 12 and 13 show cut-away views of some components of the control device of FIG. 1, in two different operating configurations.

With reference in particular to FIGS. 10-12, the switches 90, 91 may be of the push-operated type, for example of the micro-switch type or of the deformable dome-shaped diaphragm type. For example, in the switch case 92 there may be housed a switch printed circuit board or PCB 100 comprising conductive tracks and a pair of deformable diaphragms 101, 102 to close electric circuits formed by the conductive tracks, facing the switch PCB 100 to form the switches 90, 91.

The other face of the switch PCB 100 may bear a removable connector 103 for a cable system 104, comprising for example three cables, having a matching removable connector 105 a first end and a second connector 106 at the second end. The cable system 104 may pass through a hole 107 (FIG. 4) which communicates the recess 95 with the cavity 33; a gasket 108 may be provided at the hole 107

(FIG. 9). A cover 109 (FIG. 9) may be fixed, for example through a screw 110, within the recess 95 in order to seal the cable system 104.

The removable connector 106 at the second end of the cable system 104 couples to the removable connector 55 on the distal face 54 of the auxiliary PCB 35. In this way, the assembly of the control device 1 is particularly simple and fast and the replacement of the switch PCB 100 is possible independently of the replacement of the main PCB 34 and/or of the auxiliary PCB 35. However, the removable connectors 103, 105 and/or 106, 55 may be replaced by soldered connections, for example.

In the case of the control device 1 shown, as mentioned, motion transmission devices 25, 26 are provided, each one operatively interposed between the manual actuation member or control lever 10, 11 and the respective switch 90, 91. In case the motion transmission devices 25, 26 are not provided for, the manual actuation members or control levers 10, 11 may act by directly pushing on the switches 90, 91, for example in order to temporarily close the switches 90, 91.

Each motion transmission device 25, 26 may comprise a guide element 113, 114 provided with a filiform through cavity 115, 116, and a filiform body 117, 118 substantially longitudinally incompressible and slidingly guided within the guide element 113, 114. The guide element 113, 114 may have a first end 119, 120 fixed, for example in the manner better described hereinbelow, in proximity to a driven region 121, 122 of the control lever 10, 11 and a second end 123, 124 fixed in proximity to the switch 90, 91.

In the present description and the attached claims, under term "filiform", elongated and thin is meant to be understood.

In the present description and the attached claims, the expression "driven region" is used to indicate the portion of the manual actuation member which is moved when the cyclist applies a force to a control region of the manual actuation member. In the case of a manual actuation member of the lever type, the control region comprises the application point of the driving force and the driven region comprises the application point of the driven force; in the case of a push-button, the control region and the driven region are opposed faces.

The filiform body 117, 118 may have a first end 125, 126 directly or indirectly pushed, as better described hereinbelow, by the driven region 121, 122 of the control lever 10, 11 during actuation thereof and a second end 127, 128 acting by pushing on the switch 90, 91, for example temporarily closing it.

The second end 127, 128 of the filiform body 117, 118 may directly act on the switch 90, 91 or, as in the case shown, indirectly.

In the case shown, the switch case 92 has seats 129, 130 for housing a pair of ferrules 131, 132 for holding end flanges 133, 134 of the guide elements 113, 114 in order to prevent axial sliding thereof.

Through holes 135, 136 are provided on the bottom of the seats 129, 130 for the passage of the filiform bodies 117, 118, which communicate with another pair of seats 137, 138 of the case 92 and form openings thereof.

In the seats 137, 138 a pair of rigid pushers 139, 140 may be housed, which are on the side of openings 148, 149 of the seats 137, 138 and act, through the openings 148, 149, on the deformable diaphragms 101, 102.

In the seats 137, 138 a second pair of auxiliary pushers 141, 142 may be housed, on the side of the openings 135, 136 of the seats 137, 138.

In the seats 137, 138 a pair of springs 143, 144 may be housed, extending about the pushers 139, 141 and 140, 142, respectively. The elastic constant of each of the springs 143, 144 is selected such that the load of the spring 143, 144 is less than the actuation load of the switch 90, 91.

However, the elastic constant of the springs 143, 144 may, but not necessarily has to, be selected in such a manner that they push or contribute to push the pushers 141, 142 and therefore in general the manual actuation members 10, 11, away from the first openings 148, 149, in the direction of non-actuation of the switches 90, 91.

The auxiliary pushers 141, 142 are for example cup shaped in order to accommodate the ends of the filiform bodies 117, 118.

A spacer 145 may be interposed between the deformable dome-shaped diaphragms 101, 102 and the pushers 139, 140; the spacer 145 also holds the diaphragms 101, 102 in their position.

The seats 137, 138 may be oversized with respect to the stroke of the switches 90, 91. In the rest, not compressed condition of the springs 143, 144, the pushers 139, 141 and 140, 142 may then be spaced by a gap 146, 147, better discussed hereinbelow. The load of the spring 143, 144 is related to the elastic constant of the spring 143, 144 and to the entity of the gap 146, 147.

In the case shown, an auxiliary body 150 is fixed to the brake lever 5, for example housed in a region thereof having a substantially U-shaped cross-section. The auxiliary body 150 may be fixed to the brake lever 5 for example through gluing or co-moulding. The auxiliary body 150 thus becomes a single body with the brake lever 5 and might also be missing, by suitably shaping the brake lever 5.

The auxiliary body 150 may have a pair of pivot pins 151, 152 of the control levers 10, 11. The control levers 10, 11 are thus articulated on the brake lever 5, rather than on the support body 2.

The control levers 10, 11 may have protrusions 153, 154 provided with holed flanges 155, 156 configured to rotate on pivots 151, 152, being axially hold for example by elastic rings 157, 158.

The pivot pins 151, 152 of the control levers 10, 11 extend substantially orthogonal to the pivot axis 6 of the brake lever 5, almost orthogonal to the above defined longitudinal direction 8 of the brake lever 5.

The control levers 10, 11 may have end-of-stroke protrusions 159, 160.

The driven regions 121, 122 of the control levers 10, 11 may have protrusions 161, 162 provided with apertures 163, 164 forming cam surfaces 165, 166.

The cam surfaces 165, 166 amplify a displacement of the driven regions 121, 122 caused by the rotation of the control levers 10, 11 into a larger displacement of cam followers associated therewith, which actuate the switches 90, 91 by directly or indirectly pushing them, for example as described hereinbelow.

Through the provision of the cam surface 165, 166, a movement of the control lever 10, 11 large enough to be perceived by the cyclist may be allowed, also when the movement for actuating the switch 90, 91 by pushing it has to be small; furthermore, because such a large enough movement of the control lever 10, 11 is necessary, then small oscillations of the control lever 10, 11, caused by vibrations or small movements of the cyclist's hand or fingers, do not entail any involuntary actuation of the switch 90, 91.

The presence of the cam surface 165, 166 makes the magnitude of the linear displacement of pushing on the switch 90, 91 independent of the size of the lever arm, of its angular stroke, and of the position of the fulcrum with respect to the switch 90, 91.

The provision, in an electronic control device for a bicycle comprising a support body configured for attachment to the bicycle, a push-operated switch, and a control lever actuatable for switching the switch in order to issue a command, of the fact that the driven region of the control lever has a cam surface configured to amplify a displacement of the driven region caused by the rotation of the control lever into a larger displacement of a cam follower associated with the cam surface, said cam follower actuating said switch by directly or indirectly pushing it, is innovative per se, irrespectively of the presence or absence of other innovative features of the subject-matter disclosed herein.

It is noted that the protrusions 161, 162, in general the driven regions 121, 122 of the control levers 10, 11, are arranged in an intermediate zone of the control regions 12, 13, which extend substantially along the entire length of the control levers 10, 11, so that the control levers 10, 11 may act as second-class lever or as third-class lever according to where the cyclist rests his/her finger and/or of which finger he/she uses.

Cam followers 167, 168 are movable in the cam surfaces 165, 166. The first ends 125, 126 of the filiform bodies 117, 118 may be operatively associated with the cam followers 167, 168.

The cam followers 167, 168 may comprise a pair of pushers 169, 170 preferably cup-shaped in order to house the first ends 125, 126 of the filiform bodies 117, 118, and articulated in the cam followers 167, 168 so as to be able to remain extended along one and the same direction during the movement of the cam followers 167, 168 in the cam surfaces 165, 166.

The auxiliary body 150 has a pair of seats 171, 172 for snapping therein a pair of bushings 173, 174 for holding end flanges (cf. flange 176 visible in FIG. 13) of the first ends 119, 120 of the guide elements 113, 114 in order to prevent axial sliding thereof.

The bushings 173, 174 may also serve as guides of the pushers 169, 170 of the cam followers 167, 168. Through holes 177, 178 are provided on the bottom of the seats 171, 172 for the passage of the filiform bodies 117, 118.

Both at the first ends 119, 120, and at the second ends 123, 124, the guide elements 113, 114 may lack the flanges 133, 134, 176 and the corresponding one, by being fixed for example through incompressible sleeves, for example provided with conical surfaces coupled with conical surfaces of a clamping ferrule, or in other suitable ways to prevent their axial sliding.

With reference also to FIGS. 12 and 13, wherein only one manual actuation member or control lever 11 and only one motion transmission device 26 are shown, and only the main reference numbers are shown for the sake of clarity, when, in the condition of FIG. 12, the control lever 11 is not actuated, the cam follower 168 is at an end of the cam surface 166. The pusher 170 with the first end 126 of the filiform body 118 is in a rearward position, so that the first end 126 of the filiform body 118 protrudes by a comparatively large amount from the first end 120 of the guide element 114. In the case switch 92, the second end 128 of the filiform body 118 is in a rearward position and protrudes by a comparatively small amount from the second end 124 of the guide element 114. The auxiliary pusher 142 is spaced from the pusher 140 by the gap 147, the spring 144 is not compressed. The pusher 140 does not deform the deformable dome-shaped diaphragm 102, and the switch 91 is open.

When, in the condition of FIG. 13, the control lever 11 is actuated, the cam follower 168 is at the other end of the cam surface 166. The pusher 170 with the first end 126 of the filiform body 118 is in a forward position, so that the first end 126 of the filiform body 118 protrudes by a comparatively small amount from the first end 120 of the guide element 114. In the switch case 92, the second end 128 of the filiform body 118 is in a forward position and protrudes by a comparatively large amount from the second end 124 of the guide element 114. The auxiliary pusher 142 has been brought close to the pusher 140 and has pushed it, after having completely absorbed the gap 147, thus compressing the spring 144, to deform the deformable dome-shaped diaphragm 102, so that the switch 91 is closed.

When the control lever 11 is released, the return force of the spring 144 restores the condition of above-described FIG. 12.

The auxiliary pushers 141, 142 may be omitted, the second ends 127, 128 of the filiform body 117, 118 directly acting on the pushers 139, 140 which are in contact with the diaphragms 101, 102 of the switches 90, 91. The pushers 139, 140 may also be omitted, the second ends 127, 128 of the filiform body 117, 118 directly acting on the diaphragms 101, 102. Vice versa, only the auxiliary pushers 141, 142 may be present and act on the diaphragms 101, 102.

More in general, each seat 137, 138 is a sliding seat of at least one element (for example, the filiform bodies 117, 118 and/or the pushers 139, 140 and/or the pushers 141, 142) directly or indirectly pushed by the driven region of the manual actuation member 10, 11, in the case shown by the driven region 121, 122 of the control lever 10, 11. The sliding seats 137, 138 have, as mentioned, a first opening 148, 149 facing toward the switch 90, 91 and a second opening 135, 136 opposed to the first opening.

As shown in FIGS. 14 and 15, the motion transmission devices 25, 26 may have a pair of springs 179, 180 either also (FIG. 14) or only (FIG. 15) at the first ends 125, 126 of the filiform body 117, 118, which springs 179, 180 are shortened while the control levers 10, 11 are actuated, and return to an elongated condition when the control levers 10, 11 are released, thus restoring (FIG. 14) or contributing to restore (FIG. 15) the rest condition of the motion transmission devices 25, 26. The springs 179, 180 cooperate with the springs 143, 144, if provided for (FIG. 14), to restore the rest condition of the motion transmission devices 25, 26 upon release of the control lever 10, 11.

As shown in FIGS. 16 and 17, the motion transmission devices 25, 26 need not necessarily have a filiform body 117, 118 slidingly guided within a guide element 113, 114.

In FIG. 16 motion transmission devices 25, 26 are shown comprising articulated bodies 190, 191 in lieu of the filiform bodies 117, 118, formed by rigid segments 192, 193, 194; 195, 196, 197, three in the case shown merely by way of an example. The intermediate rigid segments 193, 196 may be formed by two parallel branches, as shown. The guide elements 113, 114 are omitted.

The ferrules 131, 132 and the bushings 173, 174 in this case only play the role of guiding the articulated bodies 190, 191 and they may also be omitted.

The articulated bodies 190, 191 are capable of following the movement of the brake lever 5.

In FIG. 17 motion transmission devices 25, 26 are shown, comprising rigid bodies 188, 189 in lieu of the filiform bodies 117, 118; the guide elements 113, 114 are omitted. Also in this case, the ferrules 131, 132 and the bushings 173, 174 only play the role of guides of the rigid bodies 198, 199 and might also be omitted. The rigid bodies 188, 189 do not allow the movements of the brake lever 5 to be followed, but the configuration may turn out to be useful, for example, for control devices not configured for drop bar handlebars.

In both cases of FIGS. 16 and 17, both the springs 143, 144 at the second end 127, 128 of the articulated bodies 190, 191, respectively of the rigid bodies 198, 199, in the case switch 92, and the springs 179, 180 at the first end of the articulated bodies 190, 191, respectively of the rigid bodies 188, 189, are shown, but they need not necessarily be all present.

In FIGS. 14-17 the other reference numbers, corresponding to those of FIG. 10, are omitted for the sake of simplicity.

It is noted that the filiform bodies 117, 118, the articulated bodies 190, 191, and the rigid bodies 198, 199 are all substantially longitudinally incompressible bodies.

The configuration of the oversized seats 137, 138, with the pair of pushers 139, 141; 140, 142 and the gap 146, 147 therebetween in the rest condition of the control lever 10, 11 embodies an example of a de-coupling mechanism operatively interposed between the control lever 10, 11 and the switch 90, 91. The de-coupling mechanism is effective to de-couple the manual actuation member 10, 11 from the switch 90, 91 during a first portion of the actuation stroke of the manual actuation member 10, 11.

While the first end 125, 126 of the filiform body 117, 118 is pushed (directly or indirectly as shown) by the driven region 121, 122 of the control lever 10, 11 during the actuation thereof, the second end 127, 128 of the filiform body 117, 118 acts by pushing on the switch 90, 91 only after the gap 146, 147 present between the filiform body 117, 118 and said switch 90, 91 in the rest condition of the control lever 10, 11 has been absorbed.

Through such a de-coupling mechanism, despite the small stroke of the switch 90, 91, a movement of the control lever 10, 11 or in general of the manual actuation member 10, 11 large enough to be perceived by the cyclist may be allowed, for example a rotation by 10° of the control lever 10, 11.

Furthermore, because such a large enough movement of the control lever 10, 11, in general of the manual actuation member 10, 11, is necessary, then small oscillations of the control lever 10, 11, in general of the manual actuation member 10, 11, caused for example by vibrations or small movements of the cyclist's hand or fingers, do not entail any involuntary actuation of the switch 90, 91. It is noted that this effect is additional to and independent of the similar effect of the cam surfaces 165, 166 described above.

The sliding seats 137, 138 and the gap 146, 147 may be so sized that, for example, 70% of the stroke of the control lever 10, 11, for example the first 7°, corresponds to the absorption of the gap 146, 147 while only the remaining 30% of the stroke of the control lever 10, 11 serves to effectively close the switch 90, 91.

The de-coupling mechanism, moreover, by introducing an idle stroke of the manual actuation member 10, 11, also improves the cyclist's tactile feeling because the cyclist perceives the instant when the de-coupling mechanism stops being effective, and thereafter also the instant when the switch 90, 91 closes, for example with the deformable dome-shaped diaphragm 101, 102 snapping.

As mentioned, not all the above-mentioned sliding elements in the sliding seat 137, 138 of the de-coupling mechanism are necessary, and indeed they may be totally absent when in the seat 137, 138 the driven region of the manual actuation member 10, 11 directly slides, namely when the motion transmission devices 25, 26 are totally absent. When it is a control lever, the sliding seat extends along a curve in order to allow the rotation movement of the control lever.

In order to embody the de-coupling mechanism, the gap or empty space in the sliding seat may be generally formed between the manual actuation member and the switch, in the rest condition of the manual actuation member; while the manual actuation member, during actuation thereof, acts by directly or indirectly pushing on the switch only after the absorption of said gap.

The gap 146, 147 may be considered as generally formed between the first pusher 139, 140, on the side of the sliding seat 137, 138 having the opening 148, 149 facing toward the switch 90, 91, and the manual actuation member 10, 11, when it is not actuated.

The gap 146, 147 may also be considered as generally formed between the second pusher or auxiliary pusher 141, 142 and the switch 90, 91, when the manual actuation member 10, 11 is not actuated.

The gap 146, 147 may be provided for also in the absence of one of or both pushers 139, 141; 140, 142 of each motion transmission device 25, 26, for example directly between the filiform bodies 117, 118 or the articulated bodies 190, 191 or the rigid bodies 198, 199 and the switch 90, 91.

Alternatively or additionally, another gap (not shown) may be provided for at the first end 125, 126 of the filiform bodies 117, 118 or of the articulated bodies 190, 191 or of the rigid bodies 198, 199. When two gaps are present, at both ends of the motion transmission device 25, 26, the control lever 10, 11 or in general the manual actuation device starts being effective in closing the switch 90, 91 only after having absorbed both gaps.

It is noted that the spring 143, 144 is not strictly necessary. Indeed, in the absence of the spring 143, 144, when the manual actuation member 10, 11 is not actuated, it may occur that by gravity an element sliding in the seat 137, 138 (be it the pusher 139, 140 or the pusher 141, 142 in the absence thereof or the filiform body 117, 118 in the absence thereof) faces the opening 148, 149 and enters into or remains in contact with the switch 90, 91, but does not perform the push action necessary to actuate the latter.

Moreover, it is noted that, alternatively or additionally to the spring 143, 144, other return means may be provided for, for example other springs at the first ends 125, 126 of the filiform bodies 117, 118 as described above.

The de-coupling mechanism represents an innovative aspect per se of the subject-matter disclosed herein. In particular the de-coupling mechanism may also be provided independently of the motion transmission device 25, 26.

When the motion transmission device 25, 26 comprises the substantially longitudinally incompressible filiform body 117, 118 slidingly guided within the guide element 113, 114, the filiform body 117, 118 and the guide element 113, 114 may have enough flexibility to follow the movements of the brake lever 5, in the case of a control device 1 for curved handlebars. They may have a flexural rigidity module $E \leq 20$ GPa. Between the filiform body 117, 118 and the guide element 113, 114 there may be a friction coefficient $Mu \leq 0.8$.

The filiform body 117, 118 and the guide element 113, 114 may be made of a metal material, for example steel, or of a thermoplastic material, for example polyetherketone (PEEK), or of an elastomeric material, for example of a thermoplastic elastomer (TPE), or of a composite material, for example of glass/carbon fiber reinforced polyamide (PA GF/CF Reinforced), or of a thermoset material, for example polyurethane; the material of the two components may be the same or different.

The filiform body 117, 118 and the guide element 113, 114 may be made through a process of extrusion or co-extrusion, or injection moulding, or compression moulding, or drawing, or lamination, or braiding to form a braided sock.

With reference to FIGS. 18 and 19, the filiform body 117, 118 may have a polygonal cross-section (FIG. 18) or a curvilinear cross-section so as to have longitudinal grooves (FIG. 19). Alternatively, the filiform body 117, 118 may have a polygonal cross-section. Furthermore, the cross-section of the filiform body 117, 118 may be solid or hollow. The cross-sectional shape of the cavity may be the same as the cross-sectional shape of the mantle or not.

The guide element 113, 114 may also have a hollow curvilinear cross-section so as to have longitudinal grooves 201 (FIG. 18), or a hollow polygonal cross-section, or else a hollow cylindrical cross-section. The cross-sectional shape of the cavity may be the same as the cross-sectional shape of the mantle or not.

As shown in FIG. 19, wherein the cross-sectional shapes of the filiform body 117, 118 and of the guide element 113, 114 are to be meant as being merely by way of an example, a single guide element 113 may be shared by two (or more) motion transmission devices 25, 26 provided between two or more switches 90, 91 and the respective manual actuation members 10, 11, by having two or more side-by-side filiform through cavities 115, 116.

Furthermore, as shown in FIGS. 18-19, between the filiform body 117, 118 and the guide element 113, 114 there may be a clearance 202, 203, but it is not strictly necessary.

The clearance 202, 203, if present, is for example less than the maximum cross size of the filiform body 117, 118, indicated as d_o in FIGS. 18-19. More in particular, indicating with D_o the diameter of the externally circumscribed circle of the guide element 113, 114, with D_i the diameter of the internally inscribed circle of the guide element 113, 114, with d_o the diameter of the externally circumscribed circle of the filiform body 117, 118, with d_i the diameter of the internally inscribed circle of the filiform body 117, 118, the clearance 202, 203 may be such that formula $D\_i - d\_o <= d\_0$ applies.

The filiform body 117, 118 need not necessarily be a single element rather it may be formed by a plurality of elements aligned along the filiform through cavity 115, 116 of the guide element 113, 114. For example, the elements of said plurality may be selected from the group consisting of spheres, cylinders, disks and prisms. In this way, the flexibility of the motion transmission device 25, 26 is increased, because the elements of the plurality may mutually slide in the transversal direction of the guide element 113, 114.

In particular in the case of spheres, the above-mentioned clearance 202, 203 is not necessary in that the sliding of the filiform body 117, 118 is aided by the low rolling friction of the spheres in the guide element 113, 114.

A motion transmission device 25, 26 as described above may also turn out to be useful for control devices configured for handlebars different from a drop bar, or for the so-called bar-end control devices or for control devices arranged anywhere on the bicycle frame. Indeed, also in all these cases it may turn out to be useful, for example, to arrange a manual actuation member in a remote position with respect to an electric switch controlled thereby.

It is emphasized once more that the control device 1 shown above, comprising the wireless communication device, is free of cabling towards the external.

Furthermore, thanks to the motion transmission devices 25, 26 between the control levers 10, 11 and the switches 90, 91, all the electric/electronic components are conveniently housed in the support body 2 where they may be easily electrically insulated and protected from the elements, besides from shocks and dirt.

The configuration of the switch case 92 allows a quick replacement in case of damage to the switches 90, 91 and/or to the motion transmission devices 25, 26.

As already emphasized, not all of the above-described components are necessarily present in the control device 1 and/or are not necessarily configured and/or arranged as described. Only some of the various possible changes are discussed below.

The control device 1 might be attached elsewhere on the bicycle, for example at the resting bars protruding forwards in the handlebars specialized for speed races (bar-end control devices), or in other positions of the handlebars or of the frame, the support body 2 being configured accordingly even very differently from what has been shown.

Not all the manual actuation members 5, 10, 11, 16, 17 are strictly necessary, just as vice versa there may be other manual actuation members.

The control regions of the control levers arranged behind the brake lever may have configurations and/or positions even remarkably different from what has been shown.

The control levers arranged behind the brake lever may also be pivoted on the support body, instead of on the brake lever. Said control levers need not necessarily actuate an electric switch, rather they may be mechanic control levers.

Even when the control levers arranged behind the brake lever control a respective electric switch remote therefrom, there need not necessarily be a motion transmission device of the type described above.

At the brake lever may there may also be manual actuation members different from control levers, for example of the push-button type, in order to actuate the possible switches or to emit non-electric commands. Vice versa, on the support body 2 manual actuation members of the lever type or of the small lever type or of the tilting type may be provided for, in order to actuate the possible switches or to emit non-electric commands.

In an electronic control device, one single switch controlled through a motion transmission device, or none, or more than two may be provided for.

The control device need not necessarily comprise a wireless communication module and, when comprising it, need not necessarily comprise a coaxial cable as described above.

The various alternative embodiments, variants and/or possibilities of each component or group of components that have been described are to be meant as combinable with each other in any manner, unless they are mutually incompatible.

The above is a description of various embodiments, variants and/or possibilities of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments.

Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. An electronic control device for a bicycle, comprising:
   a support body configured for attachment to a bicycle handlebar,
   a brake lever, articulated on the support body, for controlling a brake,
   a push-operated switch housed within the support body, and
   a manual actuation member actuatable for switching the push-operated switch in order to issue a command, wherein the manual actuation member is articulated on the brake lever,
   wherein a motion transmission device is operatively interposed between the manual actuation member and the push-operated switch,
   said motion transmission device comprises:
   a guide element provided with a filiform through cavity, the guide element having a first end fixed at a driven region of the manual actuation member and a second end fixed in proximity to the push-operated switch, and
   a filiform body substantially longitudinally incompressible and slidingly guided within the filiform through cavity of the guide element, the filiform body having a first end directly or indirectly pushed by the driven region of the manual actuation member during actuation thereof and a second end which acts by directly or indirectly pushing on the push-operated switch.

2. The electronic control device according to claim 1, wherein the manual actuation member is a control lever.

3. The electronic control device according to claim 2, wherein the control lever has a cam surface and the first end of the filiform body is operatively associated with a cam follower operatively associated with the cam surface.

4. The electronic control device according to claim 1, wherein the push-operated switch is of a deformable dome-shaped diaphragm type.

5. The electronic control device according to claim 1, wherein between the filiform body and the guide element there is a clearance.

6. The electronic control device according to claim 5, wherein the clearance is less than the maximum cross size of the filiform body.

7. The electronic control device according to claim 1 wherein the filiform body and the guide element have a flexural rigidity module E<=20 GPa.

8. The electronic control device according to claim 1, wherein between the filiform body and the guide element there is a friction coefficient Mu<=0.8.

9. The electronic control device according to claim 1, wherein the filiform body has a curvilinear cross-section so as to have longitudinal grooves or a cylindrical cross-section or a polygonal cross-section, and wherein the cross-section of the filiform body is solid or hollow.

10. The electronic control device according to claim 1, wherein the second end of the filiform body is operatively associated with a pusher acting by directly or indirectly pushing on the push-operated switch.

11. The electronic control device according to claim 1, wherein the electronic control device is configured for attachment to curved bicycle handlebars.

12. The electronic control device according to claim 11, wherein the manual actuation member is articulated on a rear portion of the brake lever.

13. The electronic control device according to claim 11, wherein the filiform body and the guide element have enough flexibility to follow movements of the brake lever.

14. An electronic control device for a bicycle, comprising:
   a support body configured for attachment to a bicycle handlebar,
   a brake lever, articulated on the support body, for controlling a brake,
   a first push-operated switch housed within the support body,
   a second push-operated switch housed within the support body,
   a first manual actuation member actuatable for switching said first push-operated switch in order to issue a command,
   a second manual actuation member actuatable for switching said second push-operated switch in order to issue a command,
   wherein a first motion transmission device is operatively interposed between the first manual actuation member and the first push-operated switch,
   wherein a second motion transmission device is operatively interposed between the second manual actuation member and the second push-operated switch,
   wherein a guide element is operatively interposed between the first manual actuation member and the second manual actuation member at a first end of the guide element and the first push-operated switch and the second push-operated switch at a second end of the guide element,
   said guide element having the first end fixed at a driven region of said first manual actuation member and at a driven region of said second manual actuation member, and the second end fixed in proximity to said first push-operated switch and said second push-operated switch,
   said guide element comprising a first filiform through cavity and a second filiform through cavity arranged adjacent to each other,
   said first motion transmission device comprising a first filiform body substantially longitudinally incompressible and slidingly guided within said first filiform through cavity, said first filiform body having a first end directly or indirectly pushed by the driven region of said first manual actuation member during actuation thereof and a second end directly or indirectly pushed on said first push-operated switch,
   said second motion transmission device comprising a second filiform body substantially longitudinally incompressible and slidingly guided within said second filiform through cavity, said second filiform body having a third end directly or indirectly pushed by the driven region of said second manual actuation member during actuation thereof and a fourth end directly or indirectly pushed on said second push-operated switch.

* * * * *